US012563317B2

(12) United States Patent
Miyake et al.

(10) Patent No.: US 12,563,317 B2
(45) Date of Patent: Feb. 24, 2026

(54) IMAGING ELEMENT AND IMAGING DEVICE

(71) Applicant: SONY SEMICONDUCTOR SOLUTIONS CORPORATION, Kanagawa (JP)

(72) Inventors: Shinichi Miyake, Kanagawa (JP); Kazuyuki Tomida, Kanagawa (JP); Atsumi Niwa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 198 days.

(21) Appl. No.: 18/261,364

(22) PCT Filed: Dec. 28, 2021

(86) PCT No.: PCT/JP2021/048958
§ 371 (c)(1),
(2) Date: Jul. 13, 2023

(87) PCT Pub. No.: WO2022/158278
PCT Pub. Date: Jul. 28, 2022

(65) Prior Publication Data
US 2024/0064433 A1      Feb. 22, 2024

(30) Foreign Application Priority Data
Jan. 22, 2021     (JP) ................................. 2021-008506

(51) Int. Cl.
*H04N 25/77*          (2023.01)
*H04N 25/79*          (2023.01)
(52) U.S. Cl.
CPC ............. *H04N 25/77* (2023.01); *H04N 25/79* (2023.01)

(58) Field of Classification Search
None
See application file for complete search history.

(56) References Cited

U.S. PATENT DOCUMENTS

2020/0053308 A1*    2/2020   Niwa ...................... H03M 1/56
2020/0194480 A1*    6/2020   Na ......................... H10F 30/221
2020/0358977 A1*   11/2020   Niwa ..................... H04N 25/79

FOREIGN PATENT DOCUMENTS

JP              5244587 B2      7/2013
JP          2019-195135 A     11/2019
JP          2020-161993 A     10/2020

OTHER PUBLICATIONS

International Search Report and Written Opinion of PCT Application No. PCT/JP2021/048958, issued on Mar. 15, 2022, 09 pages of ISRWO.

* cited by examiner

*Primary Examiner* — Mark T Monk
(74) *Attorney, Agent, or Firm* — CHIP LAW GROUP

(57)          ABSTRACT

Provided is an imaging element that comprises a first substrate and a second substrate. The first substrate including a plurality of detection pixels that generates a voltage signal corresponding to a logarithmic value of a photocurrent, and the second substrate including a detection circuit that detects whether the change amount of the voltage signal of a detection pixel indicated by an inputted selection signal among the plurality of detection pixels exceeds a predetermined threshold or not are stacked, and an element constituting the detection circuit is disposed in each of a first region on a back surface side and a second region on a front surface side of the second substrate. The present technology can be applied to, for example, an imaging element that detects an address event for each pixel.

10 Claims, 20 Drawing Sheets

FIG. 4

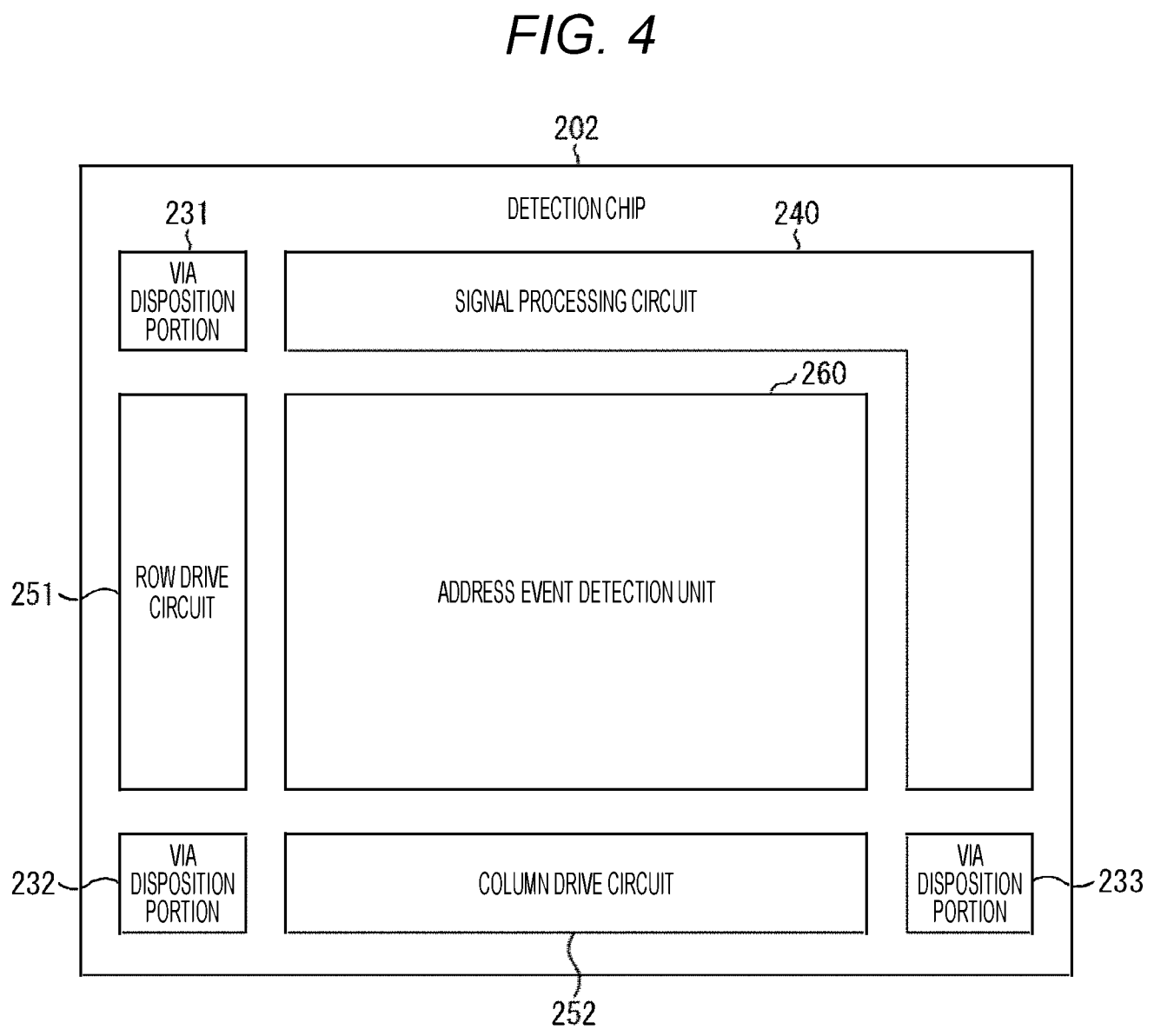

DETECTION CHIP 202

240

SIGNAL PROCESSING CIRCUIT

260

ADDRESS EVENT DETECTION UNIT

COLUMN DRIVE CIRCUIT 252

VIA DISPOSITION PORTION 231

ROW DRIVE CIRCUIT 251

VIA DISPOSITION PORTION 232

VIA DISPOSITION PORTION 233

IMAGING ELEMENT AND IMAGING DEVICE

CROSS REFERENCE TO RELATED APPLICATIONS

This application is a U.S. National Phase of International Patent Application No. PCT/JP2021/048958 filed on Dec. 28, 2021, which claims priority benefit of Japanese Patent Application No. JP 2021-008506 filed in the Japan Patent Office on Jan. 22, 2021. Each of the above-referenced applications is hereby incorporated herein by reference in its entirety.

TECHNICAL FIELD

The present technology relates to an imaging element and an imaging device, and for example, relates to an imaging element and an imaging device that compare a change amount of luminance with a threshold.

BACKGROUND ART

Conventionally, a synchronous imaging element that captures image data (frame) in synchronization with a synchronization signal such as a vertical synchronization signal is used in an imaging device or the like. In this general synchronous imaging element, image data can be acquired only in every cycle (for example, ⅟₆₀ seconds) of a synchronization signal, and therefore, it is difficult to cope with a case where faster processing is required in the fields related to traffic, robots, and the like. Thus, there has been proposed an asynchronous imaging element that detects, for every pixel address, the fact that the change amount of the luminance of the pixel has exceeded a threshold as an address event (see, for example, Patent Document 1). As described above, the imaging element that detects an address event for each pixel is called a dynamic vision sensor (DVS).

CITATION LIST

Patent Document

Patent Document 1: Japanese Patent No. 5244587

SUMMARY OF THE INVENTION

Problems to be Solved by the Invention

In the above-described asynchronous imaging element, the presence or absence of an address event is detected to increase the speed of processing such as image recognition. However, in order to detect the presence or absence of an address event, it is necessary to dispose a large number of circuits such as a logarithmic response unit, a buffer, a differentiator, and a comparator for each pixel, and the circuit scale of each pixel increases as compared with a synchronous imaging element. For this reason, there is a problem that miniaturization of pixels becomes difficult.

The present technology has been made in view of such a situation, and is configured to make it possible to facilitate miniaturization of pixels in an imaging element that detects the presence or absence of an address event.

Solutions to Problems

An imaging element according to an aspect of the present technology is an imaging element including: a first substrate including a plurality of detection pixels that generates a voltage signal corresponding to a logarithmic value of a photocurrent; and a second substrate including a detection circuit that detects whether a change amount of the voltage signal of a detection pixel indicated by an inputted selection signal among the plurality of detection pixels exceeds a predetermined threshold or not, the first substrate and the second substrate being stacked, in which an element constituting the detection circuit is disposed in each of a first region on a back surface side and a second region on a front surface side of the second substrate.

An imaging device according to an aspect of the present technology is an imaging device including: a plurality of detection pixels each configured to generate a voltage signal corresponding to a logarithmic value of a photocurrent; a detection circuit that detects whether a change amount of the voltage signal of a detection pixel indicated by an inputted selection signal among the plurality of detection pixels exceeds a predetermined threshold or not; and a signal processing unit that processes a detection signal indicating a detection result of the detection circuit, in which an element constituting the detection circuit is disposed in each of a region on a back surface side and a region on a front surface side of a substrate including the detection circuit.

In an imaging element according to an aspect of the present technology, a first substrate including a plurality of detection pixels that generates a voltage signal corresponding to a logarithmic value of a photocurrent, and a second substrate including a detection circuit that detects whether a change amount of a voltage signal of a detection pixel indicated by an inputted selection signal among the plurality of detection pixels exceeds a predetermined threshold or not are stacked. An element constituting the detection circuit is disposed in each of a first region on the back surface side and a second region on the front surface side of the second substrate.

An imaging device according to an aspect of the present technology has a configuration including the imaging element.

Note that the imaging device may be an independent device, or an internal block constituting one device.

BRIEF DESCRIPTION OF DRAWINGS

FIG. 4 is an example of a plan view of a detection chip.

FIG. 7 is a block diagram illustrating a configuration example of a detection block.

FIG. 12 is a block diagram illustrating a configuration example of a detection pixel and a detection circuit.

MODE FOR CARRYING OUT THE INVENTION

Modes (which will be hereinafter referred to as embodiments) for carrying out the present technology will be described below.

Configuration Example of Imaging Device

Figure 1:
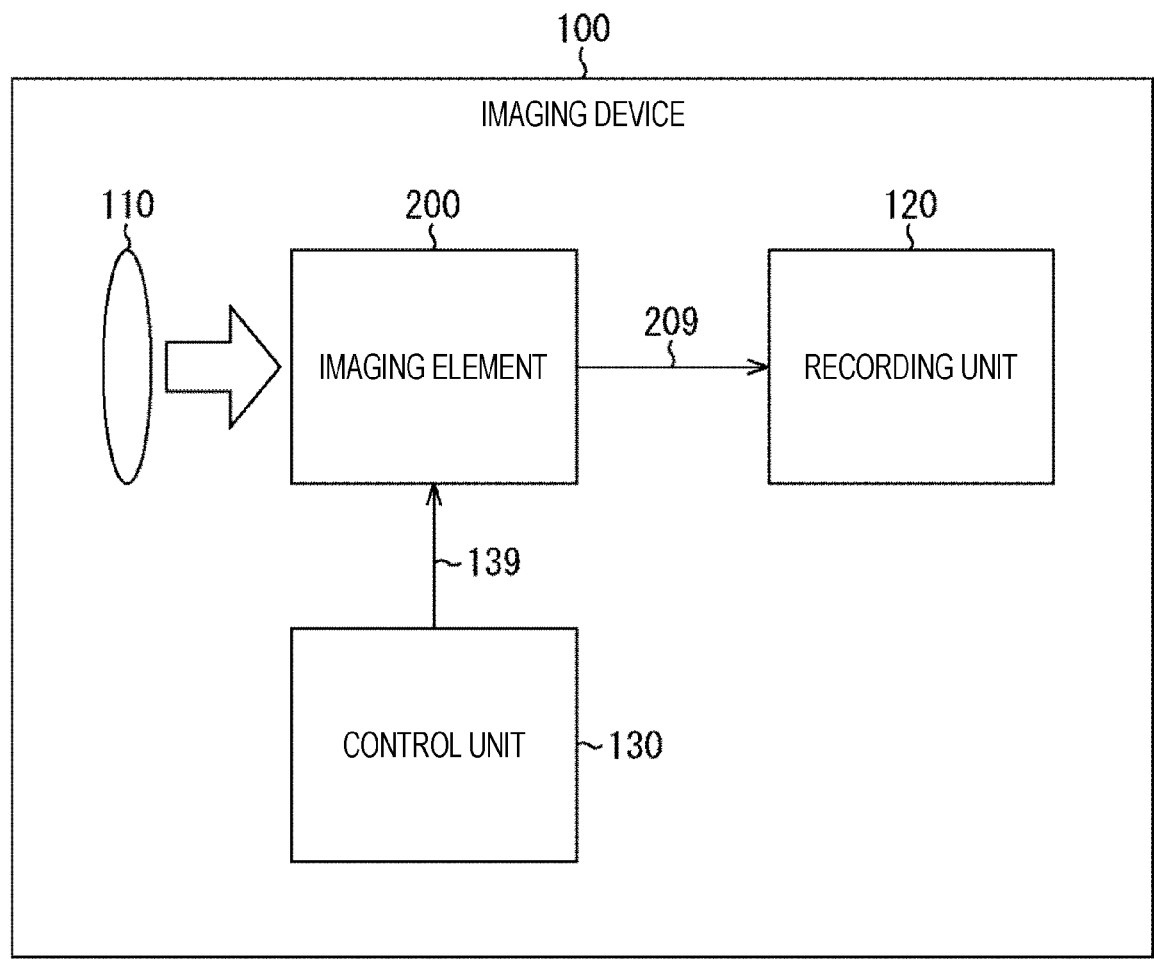
FIG. 1 is a block diagram illustrating a configuration example of an imaging device according to an embodiment of the present technology.

FIG. 1 is a block diagram illustrating a configuration example of an imaging device 100. The imaging device 100 includes an optical unit 110, an imaging element 200, a recording unit 120, and a control unit 130. As the imaging device 100, a camera mounted on an industrial robot, an in-vehicle camera, and the like are assumed.

The optical unit 110 is configured to concentrate incident light and guide the light to the imaging element 200. The imaging element 200 is configured to photoelectrically convert the incident light to capture image data. The imaging element 200 executes predetermined signal processing such as image recognition processing on the captured image data, and outputs the processed data to the recording unit 120 via a signal line 209.

The recording unit 120 is configured to record data from the imaging element 200. The control unit 130 is configured to control the imaging element 200 to capture image data.

Configuration Example of Imaging Element

Figure 2:
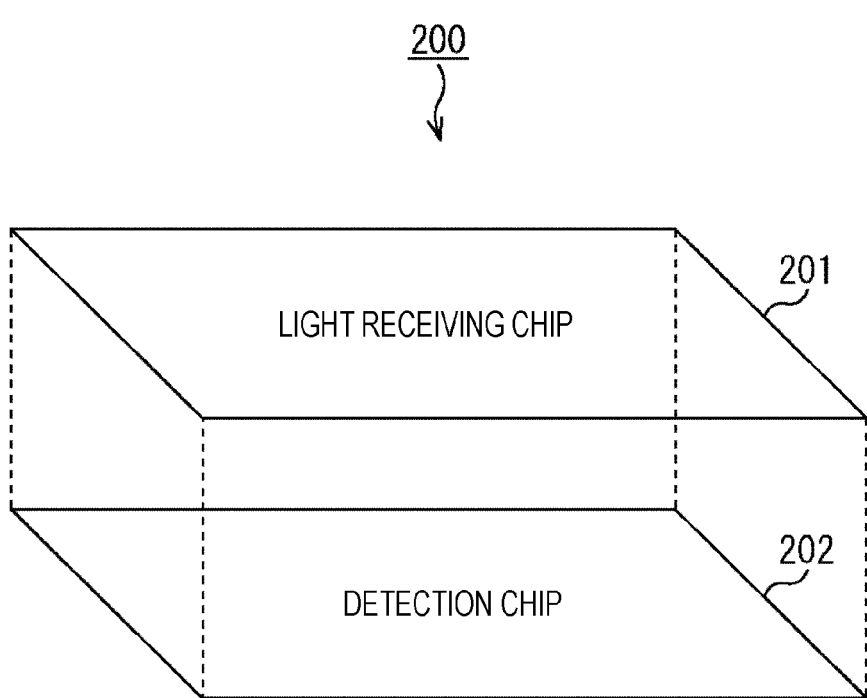
FIG. 2 is a diagram illustrating an example of a stacked structure of an imaging element.

FIG. 2 is a diagram illustrating an example of a stacked structure of the imaging element 200. The imaging element 200 includes a detection chip 202, and a light receiving chip 201 stacked on the detection chip 202. These chips are electrically connected via a connection portion such as a via. Note that the chips can be connected using Cu—Cu bonding or a bump instead of a via.

Figure 3:
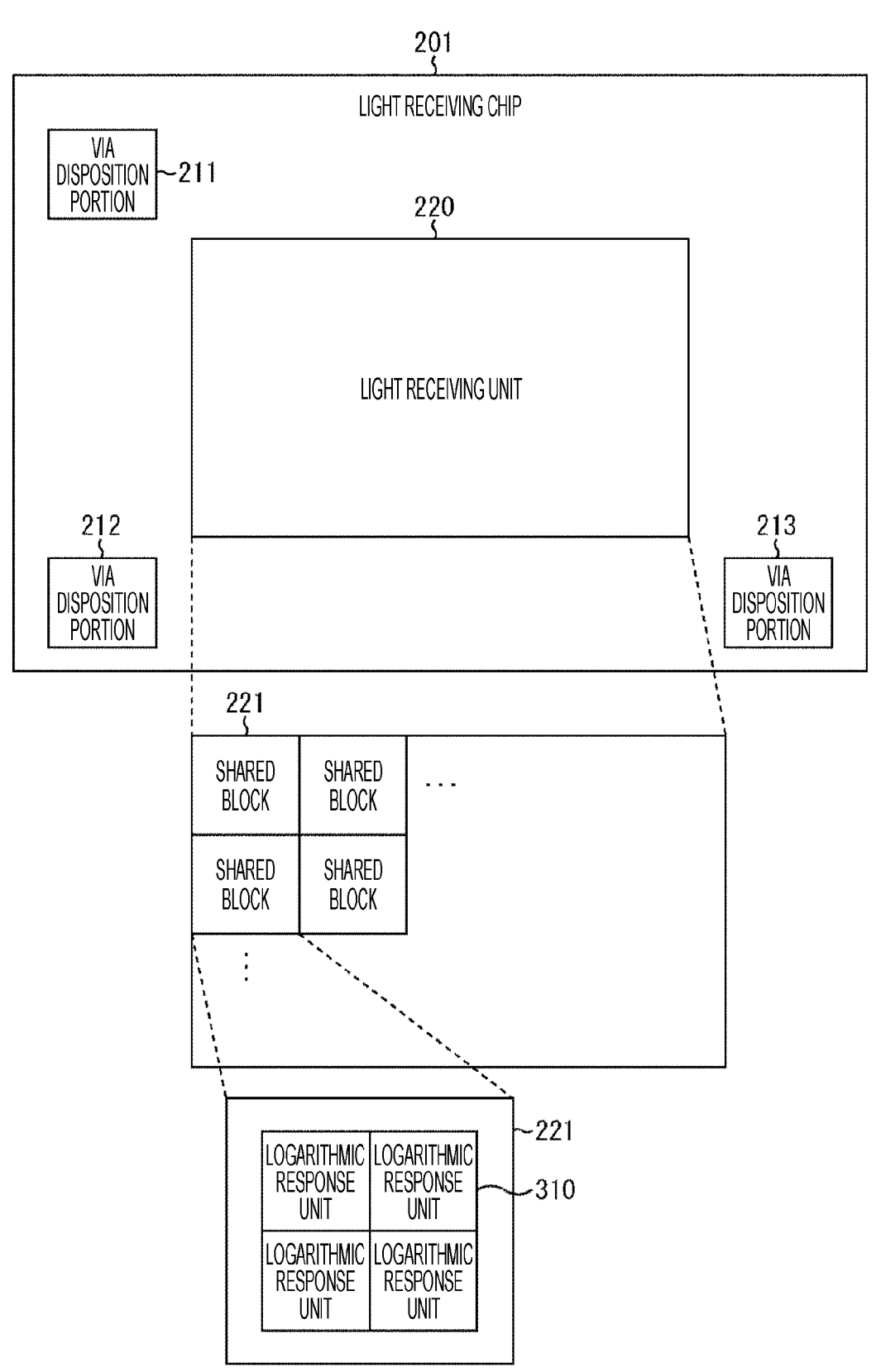
FIG. 3 is an example of a plan view of a light receiving chip.

FIG. 3 is an example of a plan view of the light receiving chip 201. The light receiving chip 201 is provided with a light receiving unit 220, a via disposition portion 211, a via disposition portion 212, and a via disposition portion 213.

A via connected with the detection chip 202 is disposed in the via disposition portions 211, 212, and 213. Furthermore, a plurality of shared blocks 221 is arranged in a two-dimensional lattice pattern in the light receiving unit 220.

A plurality of logarithmic response units 310 is arranged in each of the shared blocks 221. For example, four logarithmic response units 310 are arranged in 2 rows×2 columns for every shared block 221. These four logarithmic response units 310 share a circuit on the detection chip 202. Details of the shared circuit will be described later. Note that the number of logarithmic response units 310 in a shared block 221 is not limited to four.

The logarithmic response unit 310 is configured to generate a voltage signal corresponding to the logarithmic value of the photocurrent. A pixel address including a row address and a column address is assigned to each logarithmic response unit 310.

FIG. 4 is an example of a plan view of the detection chip 202. The detection chip 202 is provided with a via disposition portion 231, a via disposition portion 232, a via disposition portion 233, a signal processing circuit 240, a row drive circuit 251, a column drive circuit 252, and an address event detection unit 260. In the via disposition portions 231, 232, and 233, a via connected with the light receiving chip 201 is disposed.

The address event detection unit 260 is configured to detect the presence or absence of an address event for every logarithmic response unit 310 and generate a detection signal indicating the detection result.

The row drive circuit 251 is configured to select a row address and cause the address event detection unit 260 to output a detection signal corresponding to the row address.

The column drive circuit 252 is configured to select a column address and cause the address event detection unit 260 to output a detection signal corresponding to the column address.

The signal processing circuit 240 is configured to execute predetermined signal processing on a detection signal from the address event detection unit 260. The signal processing circuit 240 arranges the detection signals as pixel signals in a two-dimensional lattice pattern, and acquires image data having 2-bit information for each pixel. Then, the signal processing circuit 240 executes signal processing such as image recognition processing on the image data.

Figure 5:
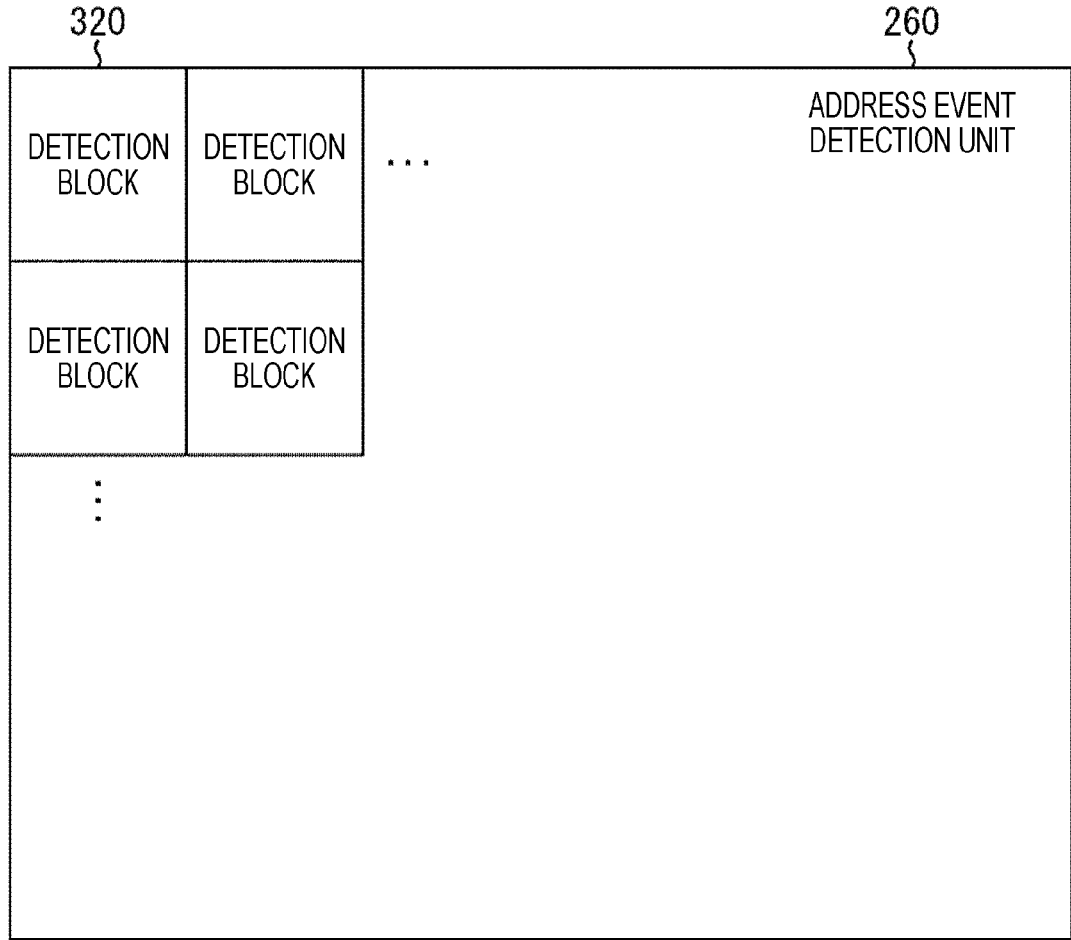
FIG. 5 is an example of a plan view of an address event detection unit.

FIG. 5 is an example of a plan view of the address event detection unit 260. In the address event detection unit 260, a plurality of detection blocks 320 is arranged. A detection block 320 is disposed for every shared block 221 on the light receiving chip 201. In a case where the number of the shared blocks 221 is N (N is an integer), N detection blocks 320 are arranged. Each detection block 320 is connected with a corresponding shared block 221.

Configuration Example of Logarithmic Response Unit

Figure 6:
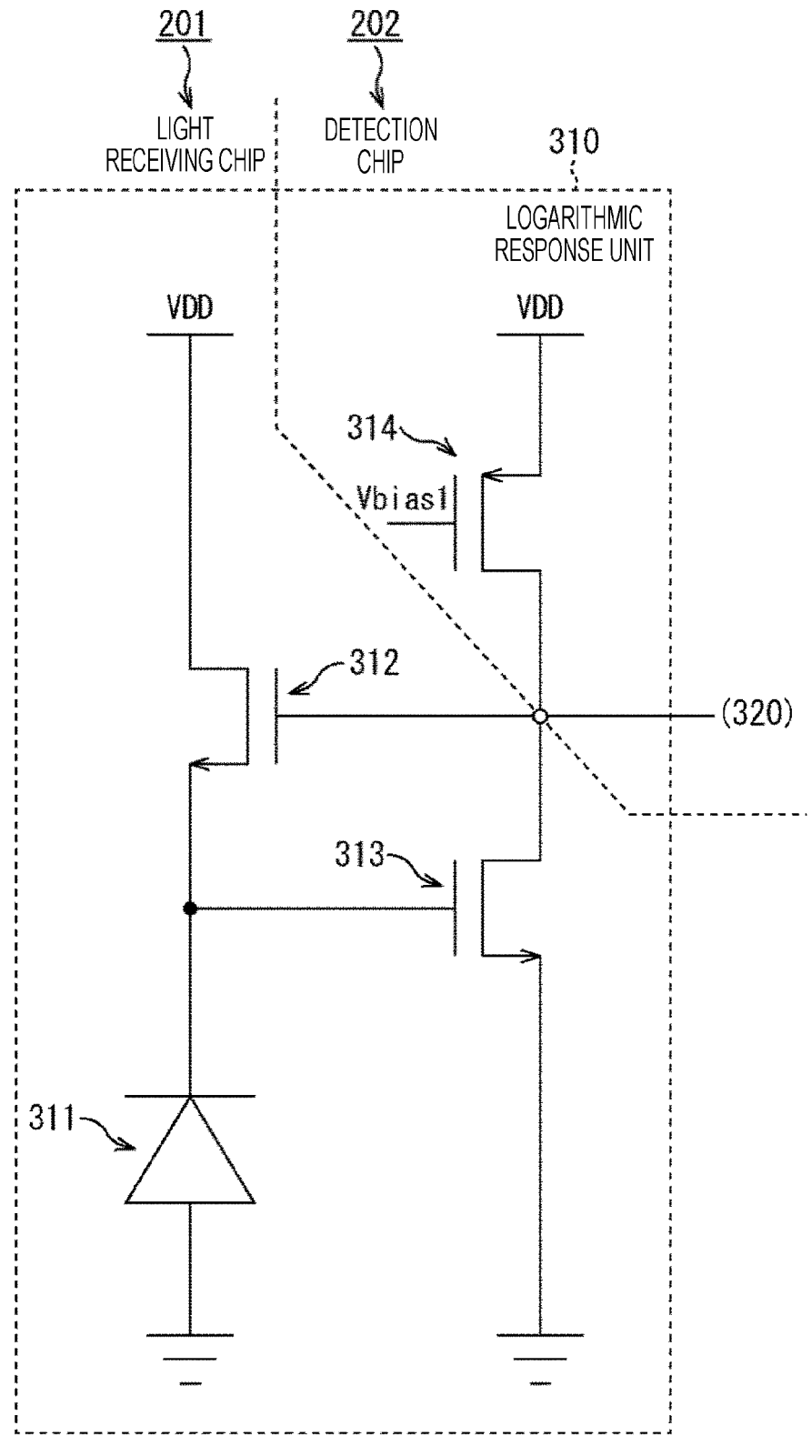
FIG. 6 is a circuit diagram illustrating a configuration example of a logarithmic response unit.

FIG. 6 is a circuit diagram illustrating a configuration example of a logarithmic response unit 310. The logarithmic response unit 310 includes a photoelectric conversion element 311, n-channel metal oxide semiconductor (nMOS) transistors 312 and 313, and a p-channel MOS (pMOS) transistor 314. Among them, the photoelectric conversion element 311 and the nMOS transistors 312 and 313 are disposed on the light receiving chip 201, for example, and the pMOS transistor 314 is disposed on the detection chip 202.

The source of the nMOS transistor 312 is connected with the cathode of the photoelectric conversion element 311, and the drain is connected with the power supply terminal. The pMOS transistor 314 and the nMOS transistor 313 are connected in series between the power supply terminal and the ground terminal. The connection point of the pMOS transistor 314 and the nMOS transistor 313 is connected with the gate of the nMOS transistor 312 and the input terminal of the detection block 320. A predetermined bias voltage Vbias1 is applied to the gate of the pMOS transistor 314.

The drains of the nMOS transistors 312 and 313 are connected with the power supply side, and such a circuit is referred to as a source follower. The photocurrent from the photoelectric conversion element 311 is converted into a voltage signal corresponding to the logarithmic value by the two source followers connected in a loop shape. The pMOS transistor 314 supplies a constant current to the nMOS transistor 313.

The ground of the light receiving chip 201 and the ground of the detection chip 202 are separated from each other for a countermeasure against interference.

Configuration Example of Detection Block

Figure 7:
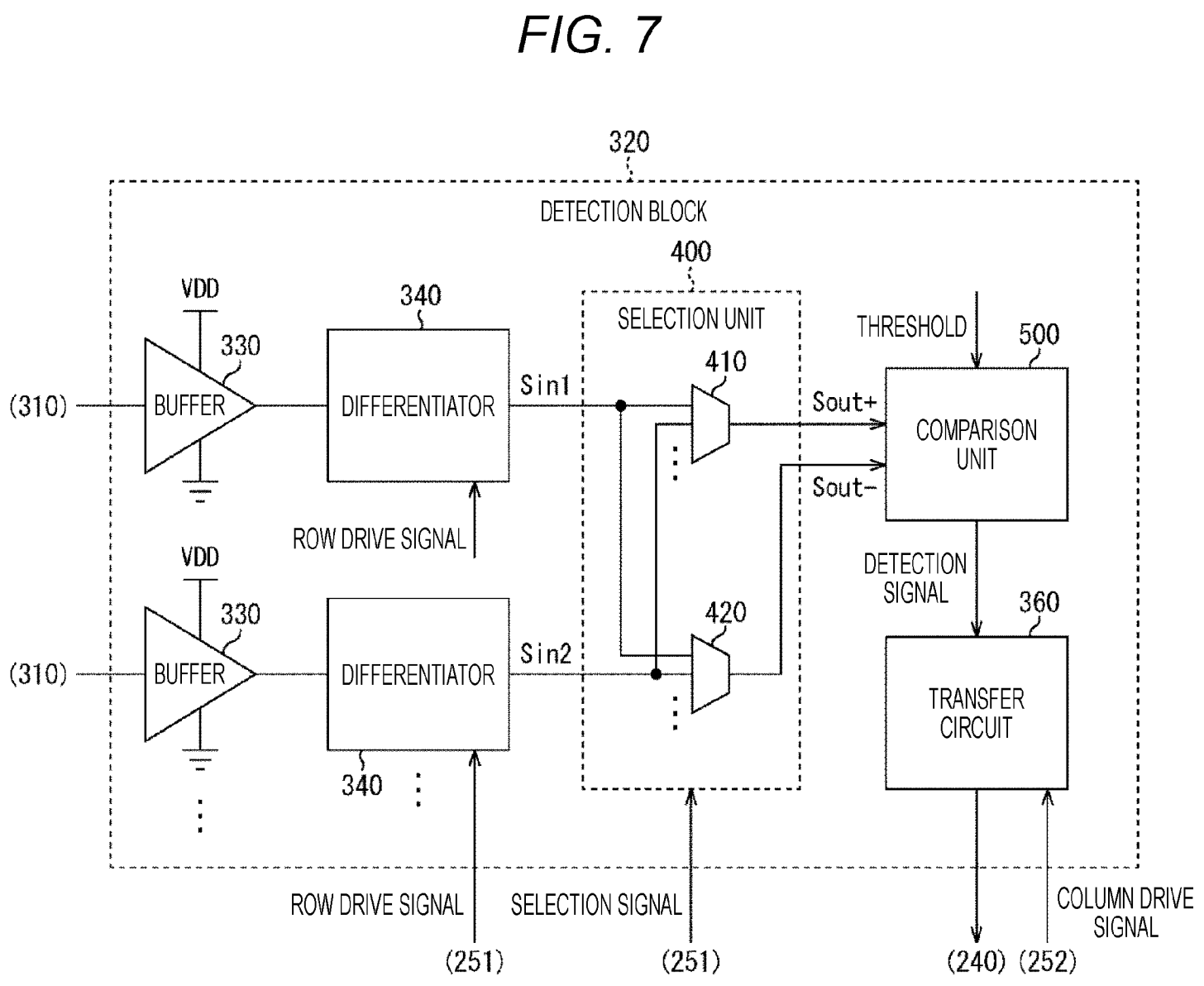

FIG. 7 is a block diagram illustrating a configuration example of a detection block 320. The detection block 320 includes a plurality of buffers 330, a plurality of differentiators 340, a selection unit 400, a comparison unit 500, and a transfer circuit 360. A buffer 330 and a differentiator 340 are disposed for every logarithmic response unit 310 in a shared block 221. For example, in a case where the number of logarithmic response units 310 in a shared block 221 is four, four buffers 330 and four differentiators 340 are disposed.

The buffer 330 is configured to output the voltage signal from the corresponding logarithmic response unit 310 to the differentiator 340. The buffer 330 can improve the driving force for driving the subsequent stage. The buffer 330 can ensure isolation of noise accompanying a switching operation in the subsequent stage.

The differentiator 340 is configured to obtain the change amount of the voltage signal as a differential signal. The differentiator 340 receives the voltage signal from the corresponding logarithmic response unit 310 via the buffer 330 and obtains the change amount of the voltage signal by differentiation. Then, the differentiator 340 supplies the differential signal to the selection unit 400. The m-th (m is an integer between 1 and M) differential signal Sin in the detection block 320 will be represented as Sinm.

The selection unit 400 is configured to select one of M differential signals according to a selection signal from the row drive circuit 251. The selection unit 400 includes selectors 410 and 420.

M differential signals Sin are inputted to the selector 410. The selector 410 selects one of the differential signals Sin according to the selection signal, and supplies the selected differential signal to the comparison unit 500 as Sout+. M differential signals Sin are also inputted to the selector 420. The selector 420 selects one of the differential signals Sin according to the selection signal, and supplies the selected differential signal to the comparison unit 500 as Sout−.

The comparison unit 500 is configured to compare the differential signal (i.e., the change amount) selected by the selection unit 400 with a predetermined threshold. The comparison unit 500 supplies a signal indicating the comparison result to the transfer circuit 360 as a detection signal.

The transfer circuit 360 is configured to transfer the detection signal to the signal processing circuit 240 according to the column drive signal from the column drive circuit 252.

Configuration Example of Differentiator

Figure 8:
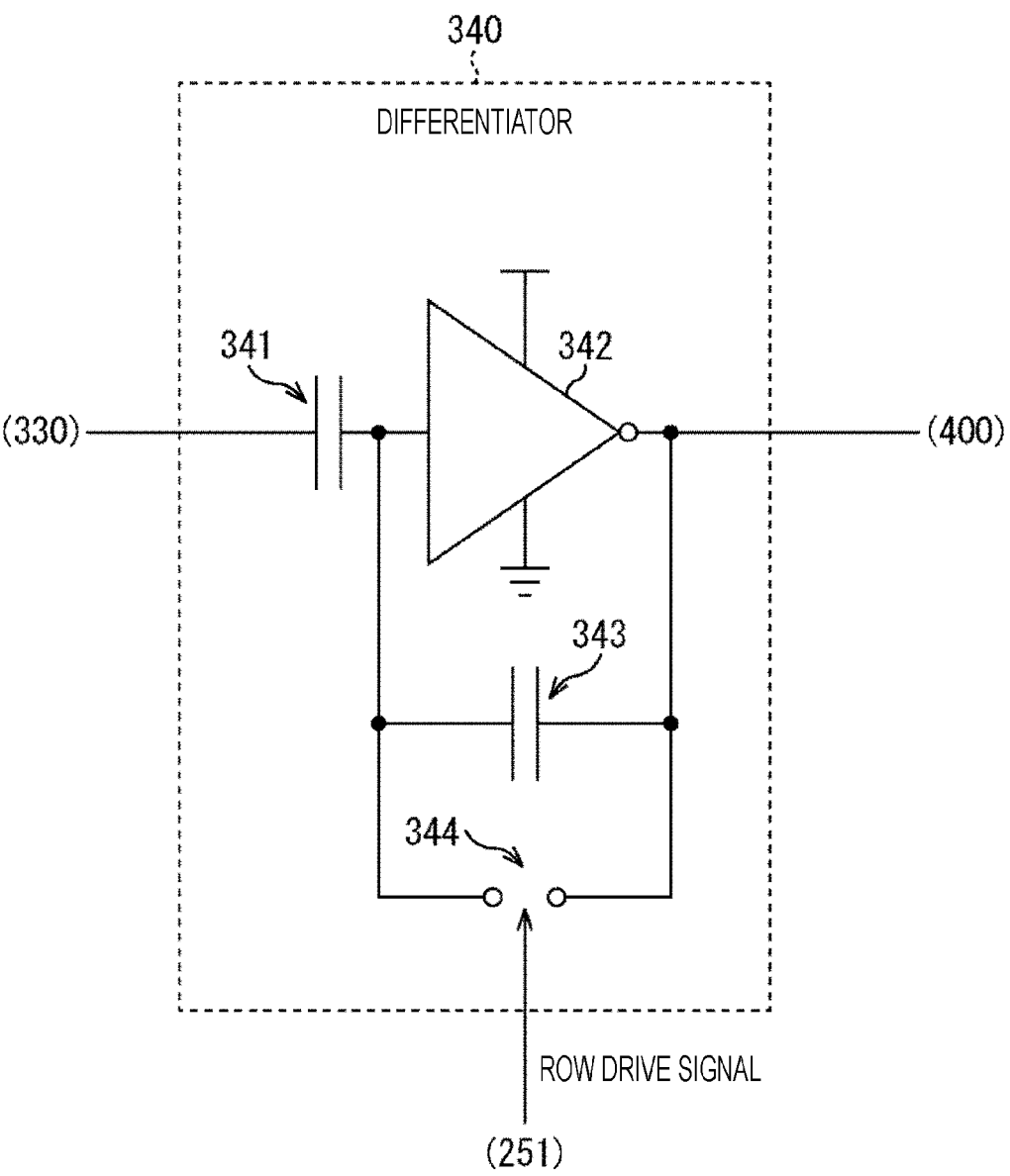
FIG. 8 is a circuit diagram illustrating a configuration example of a differentiator.

FIG. 8 is a circuit diagram illustrating a configuration example of the differentiator 340. The differentiator 340 includes a capacitor 341, a capacitor 343, an inverter 342, and a switch 344.

One end of the capacitor 341 is connected with the output terminal of the buffer 330, and the other end is connected with the input terminal of the inverter 342. The capacitor 343 is connected in parallel to the inverter 342. The switch 344 is configured to open and close a path connecting both ends of the capacitor 343 according to the row drive signal.

The inverter 342 is configured to invert a voltage signal inputted via the capacitor 341. The inverter 342 outputs the inverted signal to the selection unit 400.

When the switch 344 is turned on, a voltage signal $V_{init}$ is inputted to the buffer 330 side of the capacitor 341, and the opposite side becomes a virtual ground terminal. The potential of the virtual ground terminal is set to zero for convenience. At this time, a potential $Q_{init}$ accumulated in the capacitor 341 is expressed by the following expression, where the capacitance of the capacitor 341 is C1. On the other hand, since both ends of the capacitor 343 are short-circuited, the accumulated charge becomes zero.

$$Q_{init}=C1 \times V_{init} \qquad \text{Expression 1}$$

Next, considering a case where the switch 344 is turned off and the voltage on the buffer 330 side of the capacitor 341 changes to $V_{after}$, the charge $Q_{after}$ accumulated in the capacitor 341 is expressed by the following expression.

$$Q_{after}=C1 \times V_{after} \qquad \text{Expression 2}$$

On the other hand, the charge Q2 accumulated in the capacitor 343 is expressed by the following expression, where the output voltage is $V_{out}$.

$$Q2=-C2 \times V_{out} \qquad \text{Expression 3}$$

At this time, since the total charge amounts of the capacitors 341 and 343 do not change, the following expression is satisfied.

$$Q_{init}=Q_{after}+Q2 \qquad \text{Expression 4}$$

When Expressions 1 to 3 are substituted into Expression 4 and transformed, the following expression is obtained.

$$V_{out}=-(C1/C2) \times (V_{after}-V_{init}) \qquad \text{Expression 5}$$

Expression 5 represents the subtraction operation of the voltage signal, and the gain of the subtraction result becomes C1/C2. Since it is usually desired to maximize the gain, it is preferable to design C1 to be large and C2 to be small. On the other hand, when C2 is too small, kTC noise increases, and noise characteristic may deteriorate, and therefore, capacitance reduction of C2 is limited to a range in which noise can be tolerated. Furthermore, since the differentiator 340 is mounted for every pixel, the capacitances C1 and C2 have area restrictions. In consideration of these, for example, 01 is set to a value between 20 and 200 femtofarad (fF), and C2 is set to a value between 1 and 20 femtofarad (fF).

Configuration Example of Comparison Unit

Figure 9:
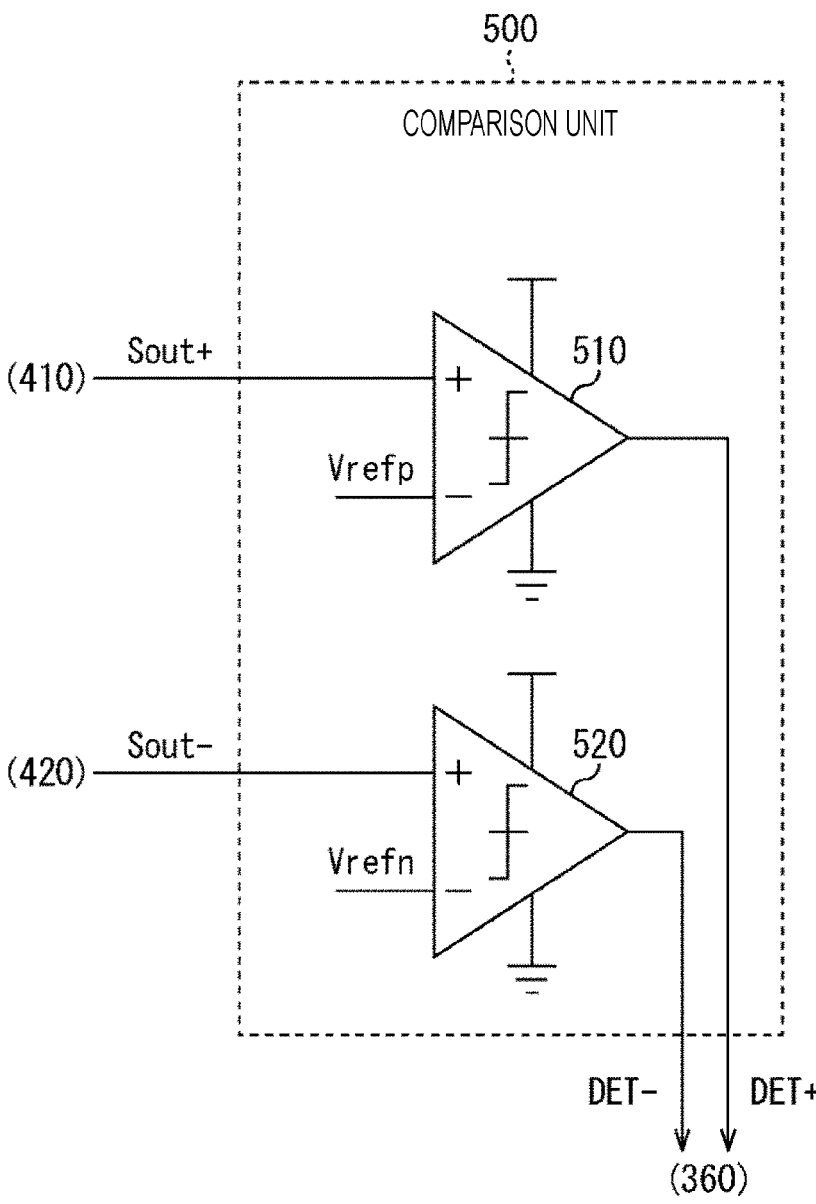
FIG. 9 is a circuit diagram illustrating a configuration example of a comparison unit.

FIG. 9 is a circuit diagram illustrating a configuration example of the comparison unit 500. The comparison unit 500 includes a comparator 510 and a comparator 520.

The comparator 510 is configured to compare the differential signal Sout+ from the selector 410 with a predetermined upper limit threshold Vrefp. The comparator 510 supplies the comparison result to the transfer circuit 360 as a detection signal DET+. The detection signal DET+ indicates the presence or absence of an on event. Here, the on event means that the change amount of the luminance exceeds a predetermined upper limit threshold.

The comparator 520 is configured to compare the differential signal Sout− from the selector 420 with a lower limit threshold Vrefn lower than the upper limit threshold Vrefp. The comparator 520 supplies the comparison result to the transfer circuit 360 as a detection signal DET–. The detection signal DET– indicates the presence or absence of an off event. Here, the off event means that the change amount of the luminance is smaller than a predetermined lower limit threshold. Note that, although the comparison unit 500 detects the presence or absence of both the on event and the off event, the comparison unit can detect only one of the on event or the off event.

Note that the comparator 510 is an example of an upper-limit-side comparator, and the comparator 520 is an example of a lower-limit-side comparator.

Figure 10:
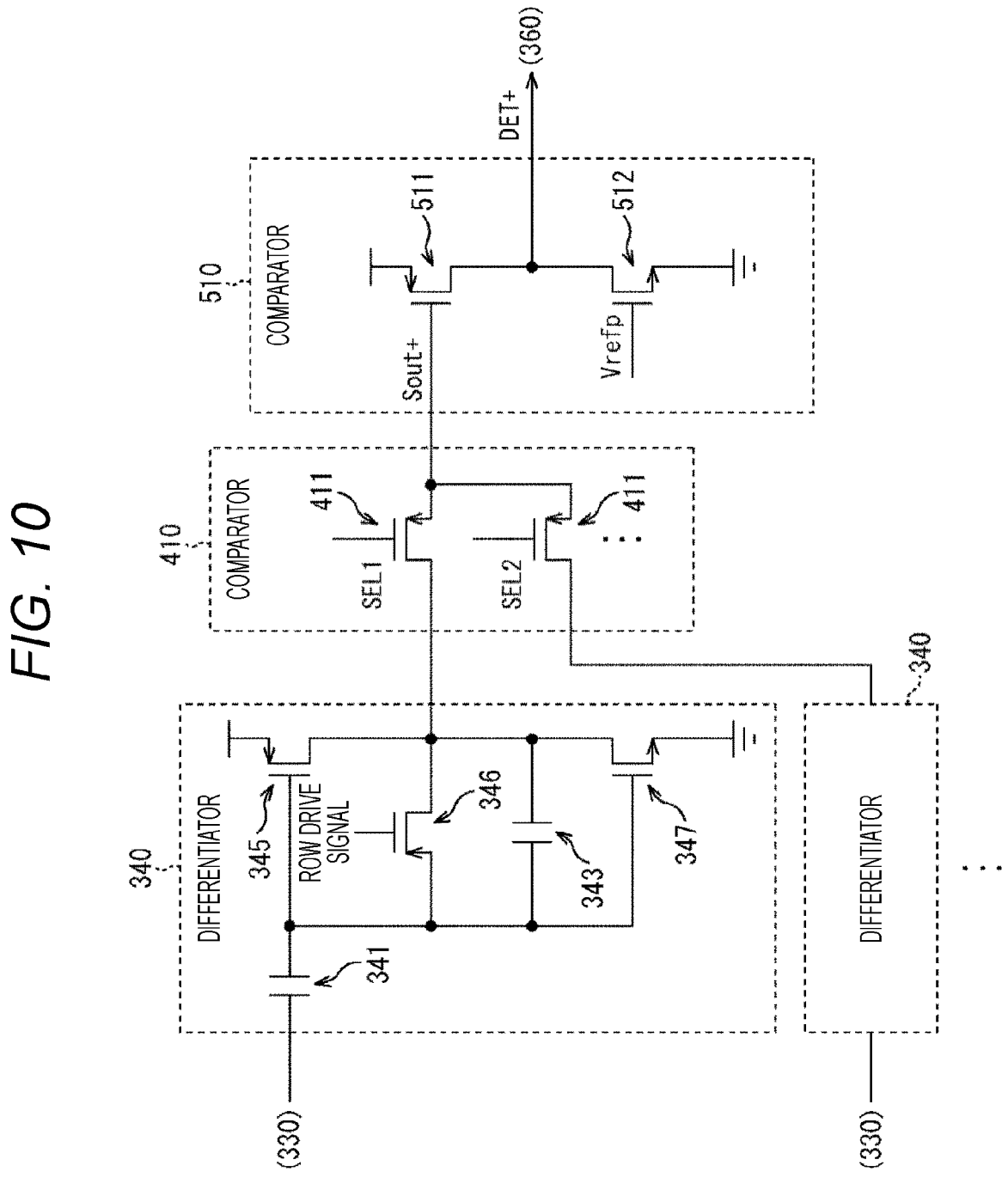
FIG. 10 is a circuit diagram illustrating a configuration example of a differentiator, a selector, and a comparator.

FIG. 10 is a circuit diagram illustrating a configuration example of the differentiator 340, the selector 410, and the comparator 510.

The differentiator 340 includes a capacitor 341, a capacitor 343, a pMOS transistor 345, a pMOS transistor 346, and an nMOS transistor 347. The pMOS transistor 345 and the nMOS transistor 347 are connected in series between a power supply terminal and a ground terminal with the pMOS transistor 345 as a power supply side. The capacitor 341 is inserted between the buffer 330 and the gates of the pMOS transistor 345 and the nMOS transistor 347. A connection point of the pMOS transistor 345 and the nMOS transistor 347 is connected with the selector 410. With this connection configuration, the pMOS transistor 345 and the nMOS transistor 347 function as the inverter 342.

The capacitor 343 and the pMOS transistor 346 are connected in parallel between the capacitor 341 and a connection point of the pMOS transistor 345 and the nMOS transistor 347. The pMOS transistor 346 functions as the switch 344.

A plurality of pMOS transistors 411 is disposed in the selector 410. A pMOS transistor 411 is disposed for every differentiator 340.

A pMOS transistor 411 is inserted between the corresponding differentiator 340 and the comparator 510. The selection signal SEL is individually inputted to each of the gates of the pMOS transistors 411. The selection signal SEL of the m-th pMOS transistor 411 will be represented as SELm. With the selection signals SEL, the row drive circuit 251 can control one of the M pMOS transistors 411 to be in the ON state and the others to be in the OFF state. Then, the differential signal Sout+ is outputted to the comparator 510 as the selected signal via the pMOS transistor 411 in the ON state. Note that the circuit configuration of the selector 420 is similar to that of the selector 410.

The comparator 510 includes a pMOS transistor 511 and an nMOS transistor 512. The pMOS transistor 511 and the nMOS transistor 512 are connected in series between the power supply terminal and the ground terminal. Furthermore, the differential signal Sout+ is inputted to the gate of the pMOS transistor 511, and the voltage of the upper limit threshold Vrefp is inputted to the gate of the nMOS transistor 512. A detection signal DET+ is outputted from a connection point of the pMOS transistor 511 and the nMOS transistor 512. Note that the circuit configuration of the comparator 520 is similar to that of the comparator 510.

Note that the circuit configurations of the differentiator 340, the selector 410, and the comparator 510 are not limited to those illustrated in FIG. 10 as long as they have the functions described with reference to FIG. 7. For example, the nMOS transistor and the pMOS transistor can be exchanged.

Figure 11:
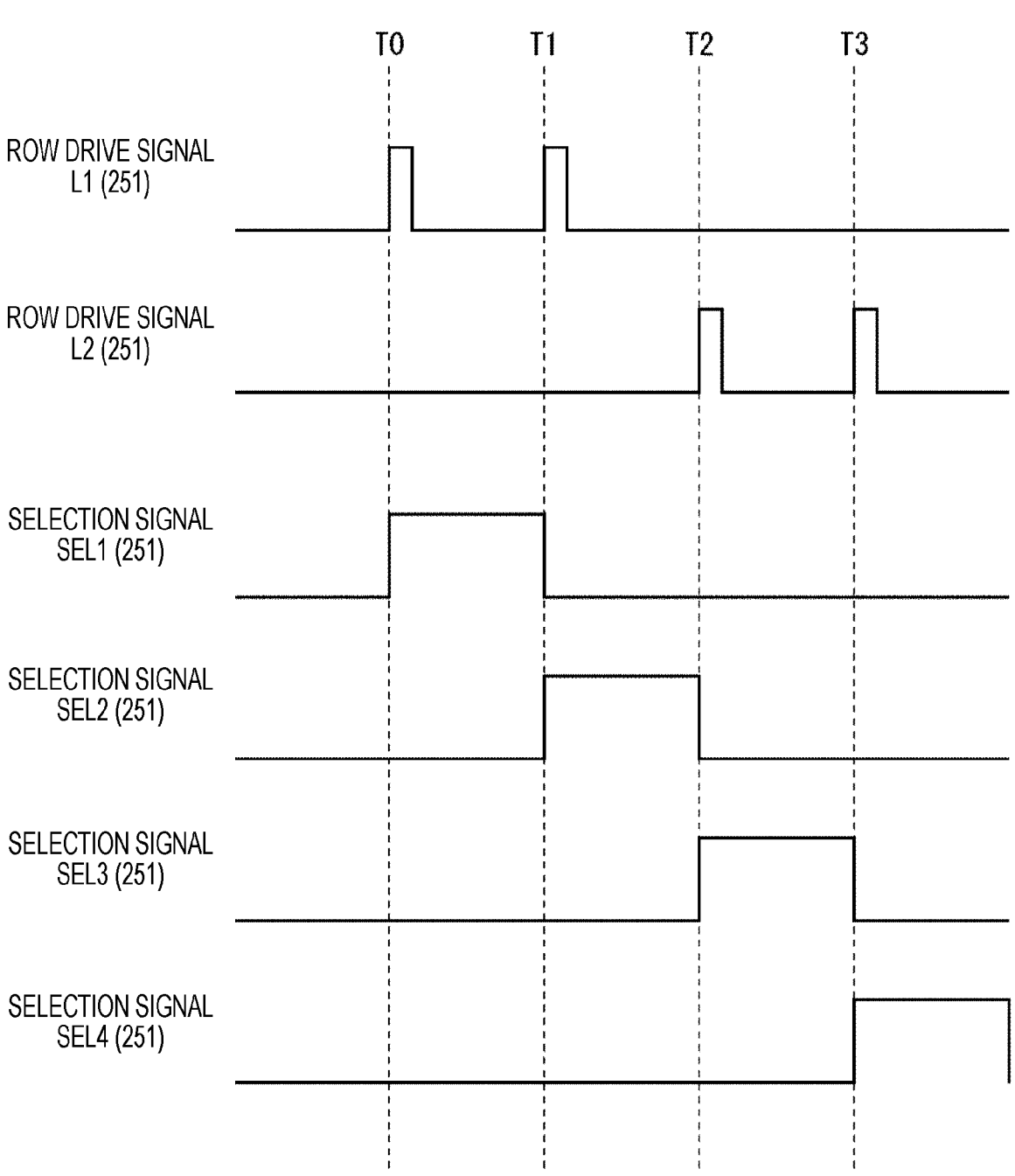
FIG. 11 is a timing chart illustrating an example of control of a row drive circuit.

FIG. 11 is a timing chart illustrating an example of control of the row drive circuit 251. At timing T0, the row drive circuit 251 selects the first row by the row drive signal L1 and drives the differentiator 340 of the selected row. The capacitor 343 in the differentiator 340 in the first row is initialized by the row drive signal L1. The row drive circuit 251 selects the upper left of 2 rows×2 columns in the shared block 221 over a certain period by the selection signal SEL1, and drives the selection unit 400. Therefore, the presence or absence of an address event is detected in the odd number column of the first row.

Next, at timing T1, the row drive circuit 251 drives the differentiator 340 in the first row again by the row drive signal L1. The row drive circuit 251 selects the upper right of 2 rows×2 columns in the shared block 221 over a certain period by the selection signal SEL2. Therefore, the presence or absence of an address event is detected in the even number column of the first row.

At timing T2, the row drive circuit 251 drives the differentiator 340 in the second row by the row drive signal L2. The capacitor 343 in the differentiator 340 in the second row is initialized by the row drive signal L2. The row drive circuit 251 selects the lower left of 2 rows×2 columns in the shared block 221 over a certain period by the selection signal SEL3. Therefore, the presence or absence of an address event is detected in the odd number column of the second row.

Subsequently, at timing T3, the row drive circuit 251 drives the differentiator 340 in the second row again by the row drive signal L2. The row drive circuit 251 selects the lower right of 2 rows×2 columns in the shared block 221 over a certain period by the selection signal SEL4. Therefore, the presence or absence of an address event is detected in the even number column of the second row.

Thereafter, similarly, the row drive circuit 251 sequentially selects a row in which the logarithmic response units 310 are arranged, and drives the selected row by a row drive signal. Each time a row is selected, the row drive circuit 251 sequentially selects each of the detection pixels 300 in the shared block 221 of the selected row by a selection signal. For example, in a case where the detection pixels 300 of 2 rows×2 columns are arranged in the shared block 221, every time a row is selected, an odd number column and an even number column in the row are sequentially selected.

Note that the row drive circuit 251 can sequentially select a row in which the shared blocks 221 are arranged, in other words, two rows of the logarithmic response unit 310. In this case, every time a row is selected, four detection pixels in the shared block 221 of the row are sequentially selected.

Figure 12:
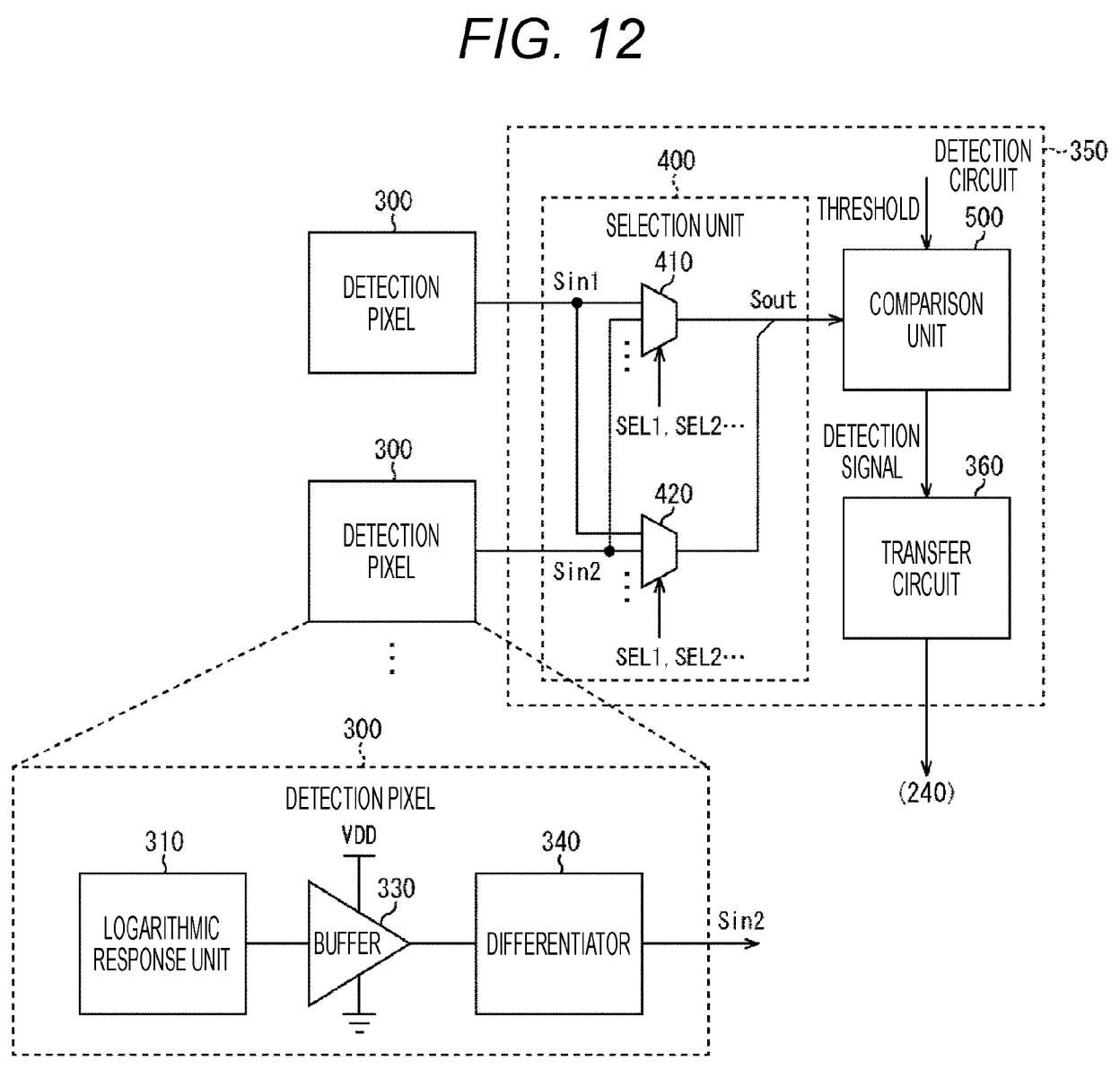

FIG. 12 is a block diagram illustrating a configuration example of a detection pixel 300 and a detection circuit 305. Among the detection blocks 320 shared by a plurality of logarithmic response units 310 in a shared block 221, a circuit including a selection unit 400, a comparison unit 500, and a transfer circuit 360 will be referred to as a detection circuit 305. Furthermore, a circuit including a logarithmic response unit 310, a buffer 330, and a differentiator 340 will be referred to as a detection pixel 300. As illustrated in the figure, a detection circuit 305 is shared by a plurality of detection pixels 300.

Each of the plurality of detection pixels 300 sharing the detection circuit 305 generates a voltage signal corresponding to the logarithmic value of the photocurrent. Then, each of the detection pixels 300 outputs a differential signal Sin indicating the change amount of the voltage signal to the detection circuit 305 according to the row drive signal. In each of the detection pixels 300, a voltage signal corresponding to a logarithmic value is generated by the logarithmic response unit 310, and a differential signal is generated by the differentiator 340.

Selection signals such as a selection signal SEL1 and a selection signal SEL2 are commonly inputted to the selector 410 and the selector 420 in the detection circuit 305. The detection circuit 305 selects a differential signal, that is, the change amount of a detection pixel indicated by the selection signal among the plurality of detection pixels 300, and detects whether the change amount exceeds a predetermined threshold or not. Then, the detection circuit 305 transfers the detection signal to the signal processing circuit 240 according to the column drive signal. In the detection circuit 305, the differential signal is selected by the selection unit 400, and the comparison with the threshold is performed by the comparison unit 500. Furthermore, the detection signal is transferred by the transfer circuit 360.

Here, in general DVS, the comparison unit 500 and the transfer circuit 360 are disposed for every detection pixel together with the logarithmic response unit 310, the buffer 330, and the differentiator 340. On the other hand, in the above-described configuration in which the detection circuit 305 including the comparison unit 500 and the transfer circuit 360 is shared by a plurality of detection pixels 300, the circuit scale of the imaging element 200 can be reduced as compared with a case where the detection circuit is not shared. Therefore, miniaturization of pixels becomes easy.

In particular, in a case where the stacked structure is adopted, the circuit scale of the detection chip 202 is larger than that of the light receiving chip 201 in a general configuration in which the detection circuit 305 is not shared. Accordingly, the pixel density is limited by the circuit on the detection chip 202 side, and miniaturization of pixels becomes difficult. However, since a plurality of detection pixels 300 shares the detection circuit 305, the circuit scale of the detection chip 202 can be reduced, and the pixels can be easily miniaturized.

Note that, although the buffer 330 is disposed for every detection pixel 300, the present invention is not limited to this configuration, and the buffer 330 may not be provided.

Although the photoelectric conversion element 311, the nMOS transistor 312, and the nMOS transistor 313 of the logarithmic response unit 310 are disposed in the light receiving chip 201, and the pMOS transistor 314 and subsequent units are disposed in the detection chip 202, the present invention is not limited to this configuration. For example, only the photoelectric conversion element 311 can be disposed in the light receiving chip 201, and the other components can be disposed in the detection chip 202.

Only the logarithmic response unit 310 can be disposed in the light receiving chip 201, and the buffer 330 and the subsequent components can be disposed in the detection chip 202. The logarithmic response unit 310 and the buffer 330 may be disposed in the light receiving chip 201, and the differentiator 340 and the subsequent components may be disposed in the detection chip 202. The logarithmic response unit 310, the buffer 330, and the differentiator 340 may be disposed in the light receiving chip 201, and the detection circuit 305 and the subsequent components may be disposed in the detection chip 202. It is also possible to dispose components up to the selection unit 400 in the light receiving chip 201 and dispose the comparison unit 500 and the subsequent components in the detection chip 202.

Operation Example of Imaging Element

Figure 13:
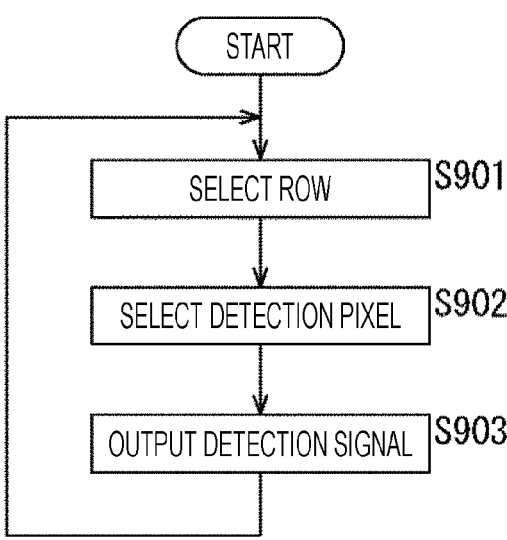
FIG. 13 is a flowchart illustrating an example of operation of the imaging element.

FIG. 13 is a flowchart illustrating an example of the operation of the imaging element 200. This operation is started when, for example, a predetermined application for detecting the presence or absence of an address event is executed.

The row drive circuit 251 selects one of the rows (step S901). Then, the row drive circuit 251 selects and drives one of the detection pixels 300 in each shared block 221 in the selected row (step S902). The detection circuit 305 detects the presence or absence of an address event in the selected detection pixel 300 (step S903). After step S903, the imaging element 200 repeatedly executes step S901 and subsequent steps.

As described above, since the detection circuit 305 that detects the presence or absence of an address event is shared by a plurality of detection pixels 300, the circuit scale can be reduced as compared with a case where the detection circuit 305 is not shared. Therefore, miniaturization of detection pixels 300 becomes easy.

Cross-Sectional Configuration Example of Imaging Element

Figure 14:
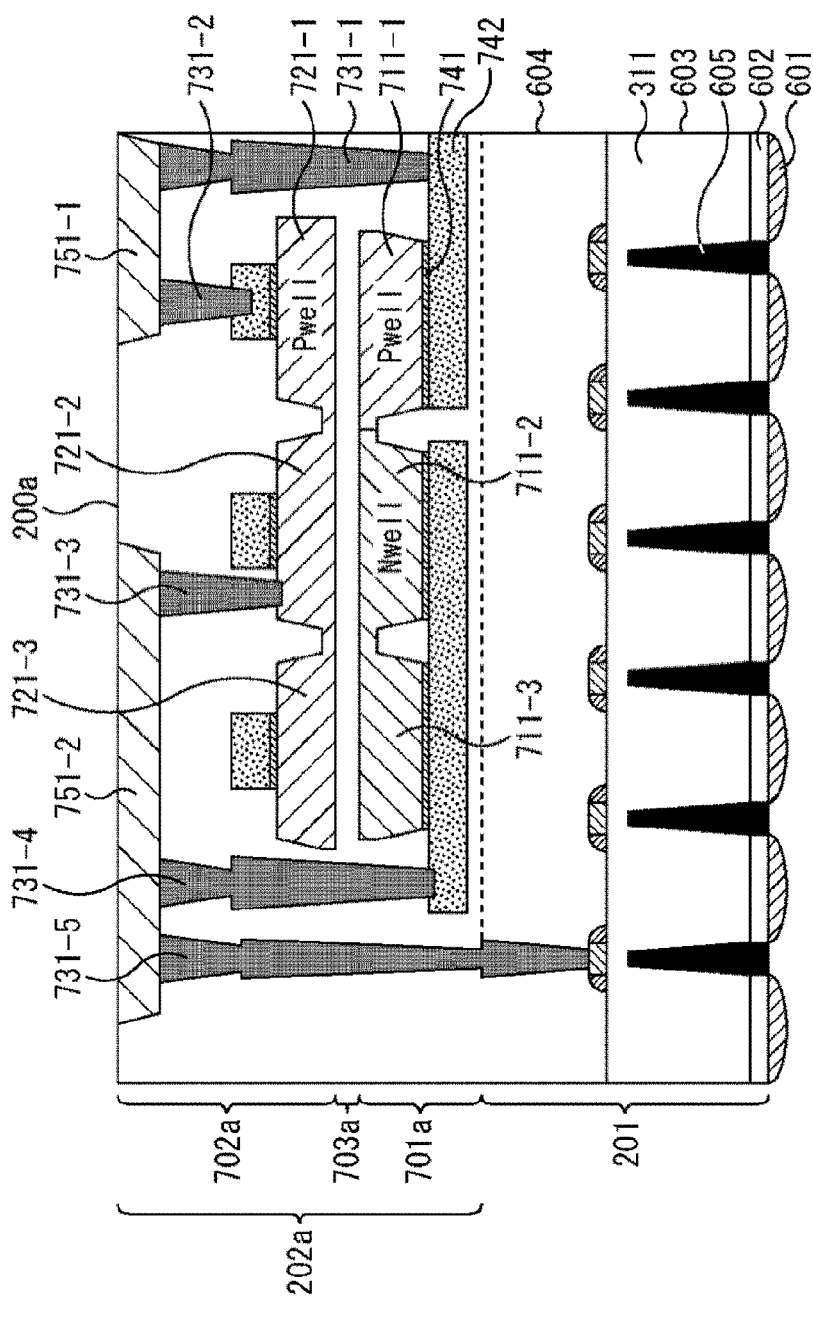
FIG. 14 is a diagram illustrating a cross-sectional configuration example of an imaging element.

As described with reference to FIG. 2, the imaging element 200 has a configuration in which the light receiving chip 201 and the detection chip 202 are stacked. FIG. 14 is a diagram illustrating a cross-sectional configuration example of an imaging element 200a according to the first embodiment.

The lower side in the figure is the light receiving chip 201, and the detection chip 202 is stacked on the upper side in the figure. In FIG. 14, the lower side in the figure is the incident surface side.

In the light receiving chip 201, an on-chip lens layer 601, a color filter layer 602, a photoelectric conversion element layer 603, and a wiring layer 604 are stacked in this order from the bottom in the figure. A photoelectric conversion element 311 is formed in the photoelectric conversion element layer 603, and an inter-pixel separation portion 605 for preventing light from leaking into adjacent pixels is formed between the photoelectric conversion elements 311. In the wiring layer 604, gates of the nMOS transistors 313 (FIG. 6) and the like, and a plurality of wirings (not illustrated) are formed.

The detection chip 202 is formed as one semiconductor layer, and is a layer in which devices such as a capacitive element and a transistor are formed respectively on the front surface and the back surface of one semiconductor substrate. Here, the lower side of the detection chip 202 in the figure will be referred to as a back surface, and a region on the back surface side will be referred to as a back surface region 701a. Similarly, the upper side in the figure will be referred to as a front surface, and a region on the front surface side will be referred to as a front surface region 702a.

In each of the back surface region 701a and the front surface region 702a, devices such as a plurality of transistors included in the detection chip 202 are formed. That is, the detection chip 202 of the imaging element 200 illustrated in FIG. 14 has a configuration in which elements are provided on each of both surfaces of a semiconductor substrate. In order to separate the elements provided respectively on both surfaces of the semiconductor substrate, a separation layer 703a is provided between the back surface region 701a and the front surface region 702a.

The separation layer 703a is only required to have a configuration in which the back surface region 701a and the front surface region 702a can be electrically separated by an insulating film or an injection layer.

By a configuration in which the elements are provided on both surfaces of the semiconductor substrate as described above, the area efficiency can be increased, and pixel miniaturization can be further advanced.

In general DVS, the comparison unit 500 and the transfer circuit 360 are disposed for every detection pixel together with the logarithmic response unit 310, the buffer 330, and the differentiator 340. Thus, the circuit scale of the detection chip 202 tends to be larger than that of the light receiving chip 201. Accordingly, the pixel density is limited by the circuit on the detection chip 202 side, and miniaturization of pixels becomes difficult.

According to the present technology, elements can be disposed on both surfaces of one semiconductor substrate, and the elements can be disposed with increased area efficiency. Thus, by applying the present technology to general DVS, the detection chip 202 having a large circuit scale can be made to have the same size as the light receiving chip 201 and can be stacked without limiting the pixel density of the light receiving chip 201.

In a case where the configuration in which the detection circuit 305 including the comparison unit 500 and the transfer circuit 360 is shared by a plurality of detection pixels 300 is applied as described above, the circuit scale of the imaging element 200 can be reduced as compared with a case where the detection circuit is not shared. Thus, in a case where the detection circuit 305 is configured to be shared by a plurality of detection pixels 300, the detection chip 202 can be further downsized, and miniaturization of pixels becomes easy.

In the example illustrated in FIG. 14, an element 711-1, an element 711-2, and an element 711-3 are formed in the back surface region 701a. An element 721-1, an element 721-2, and an element 721-3 are formed in the front surface region 702a. In the following description, in a case where it is not necessary to individually distinguish the elements 711-1 to 711-3, the elements will be simply described as elements 711. Other parts will be described in a similar manner.

FIG. 14 describes, as an example, a case where the element 711-1 is an element having a Pwell region, and the element 711-2 and the element 711-3 are elements having Nwell regions. FIG. 14 also describes a case where the elements 721-1 to 721-3 are elements having Nwell regions. The example illustrated in FIG. 14 is an example, and is not a description indicating limitation.

The Pwell region included in the element 711-1 is connected with a wiring 742 via a gate 741. The wiring 742 is connected with a contact 731-1. The configuration in which the contact 731-1 is connected with the element 711-1 enables electrical control. Similarly to the element 711-1, the other elements 711 and 721 also have a gate and a wiring, and are configured to be electrically controlled by being connected with a contact.

The element 711-2 and the element 711-3 formed in the back surface region 701a is connected with a contact 731-4. The element 721-1 formed in the front surface region 702a is connected with a contact 731-2, and the element 721-2 is connected with a contact 731-3. A contact 731-5 is connected with a predetermined gate formed in the light receiving chip 201.

The contact 731-1 and the contact 731-2 are connected with an electrode 751-1, and the contacts 731-3 to 731-5 are connected with an electrode 751-2. The electrode 751-1 and the electrode 751-2 function as terminals connected with other chips and the like (not illustrated).

In this manner, the elements 711 and 721 formed respectively in the back surface region 701a and the front surface region 702a are connected by the contacts 731. The light receiving chip 201 and the detection chip 202a are also connected by the contacts 731.

The elements 711 formed in the back surface region 701a and the front surface region 702a are switching elements such as transistors, capacitive elements, resistance elements, and the like included in the detection chip 202. Regarding the elements formed respectively in the back surface region 701a and the front surface region 702a, for example, an element desired to have a good S value (subthreshold swing value) can be formed in one region, and an element not desired to have a good S value can be formed in the other region. That is, in this case, elements having different S-value characteristics can be disposed in the back surface region 701a and the front surface region 702a.

For example, in a case where an element is formed on one surface and then another element is formed on the other surface in a step of forming elements on both surfaces of one semiconductor substrate, heat may be applied to the previously formed element when an element to be formed later is formed. An element having a characteristic that changes due to excessive heat application may be formed on a surface side on which an element is to be formed later, and an element not having a characteristic that changes due to excessive heat application may be formed on a surface side on which an element is to be formed previously. That is, in this case, elements having different thermal characteristics can be disposed in the back surface region 701a and the front surface region 702a.

Regarding the elements formed respectively in the back surface region 701a and the front surface region 702a, for example, an element driven at a low voltage can be formed on one side, and another element driven at a voltage higher than the low voltage can be formed on the other side. That is, in this case, elements having different drive voltages can be disposed in the back surface region 701a and the front surface region 702a.

Regarding the elements formed respectively in the back surface region 701a and the front surface region 702a, for example, an element having a low noise in the interface order near the gate can be formed on one side, and another element having a possibility of causing noise higher than the low noise can be formed on the other side. That is, in this case, elements having different gate interface states can be disposed in the back surface region 701a and the front surface region 702a.

In the imaging element 220a illustrated in FIG. 14, three device layers are formed by two semiconductor substrates.

As described above, by forming the elements respectively on both surfaces of one semiconductor substrate, the elements included in the detection chip 202 can be more efficiently accommodated, and the imaging element 200 can be further downsized.

<Cross-Sectional Configuration Example of Imaging Element According to Second Embodiment>

Figure 15:
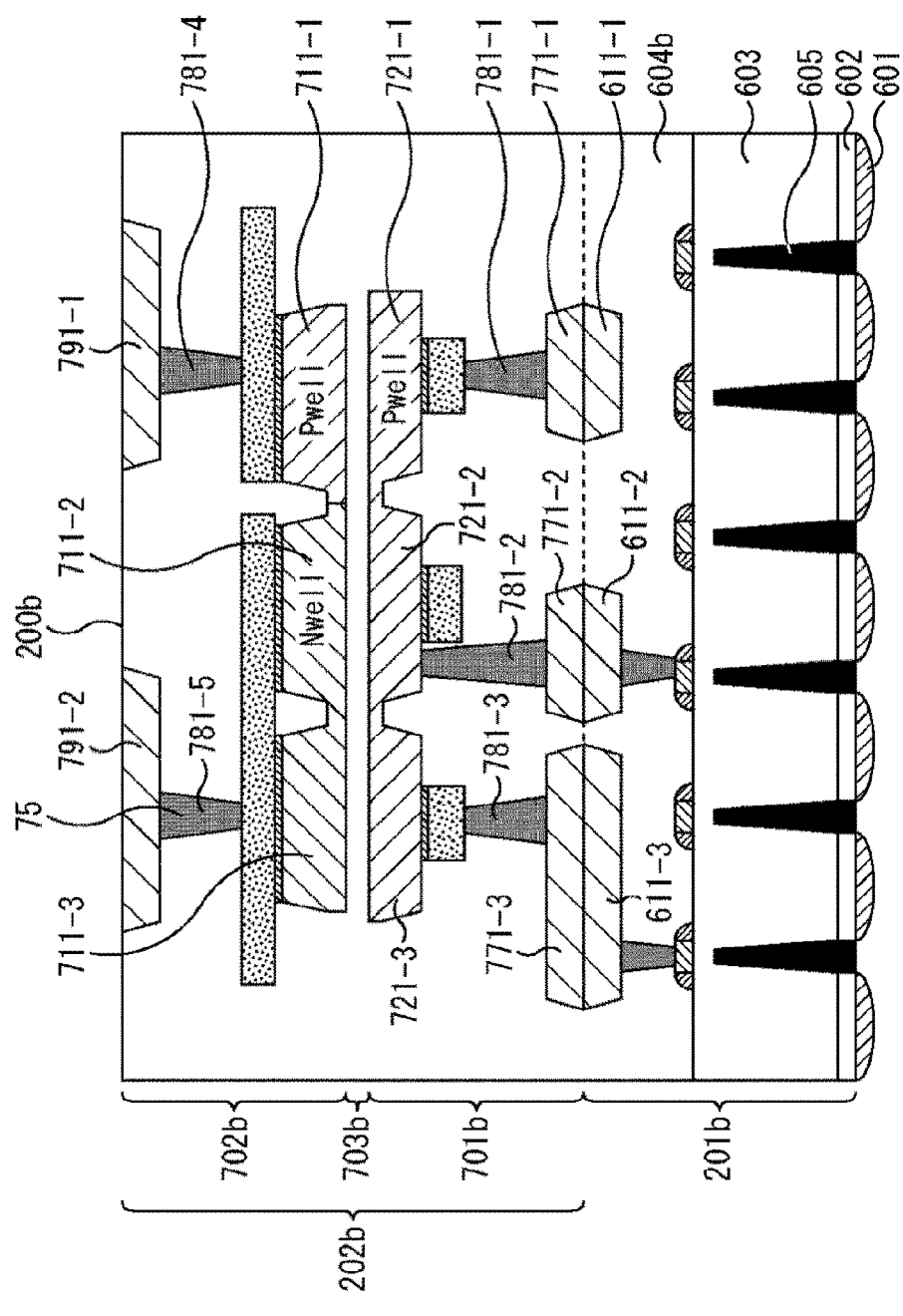
FIG. 15 is a diagram illustrating another cross-sectional configuration example of an imaging element.

FIG. 15 is a diagram illustrating a cross-sectional configuration example of an imaging element 200b according to the second embodiment.

The imaging element 200b illustrated in FIG. 15 is different from the imaging element 200a according to the first embodiment in that a light receiving chip 201b and a detection chip 202b are directly bonded to each other at wiring layers. Similarly to the imaging element 200a illustrated in FIG. 14, three device layers are also formed by two semiconductor substrates in the imaging element 200b illustrated in FIG. 15.

Terminals (wirings) 611-1 to 611-3 for bonding to the detection chip 202*b* are provided on the front surface side of the light receiving chip 201*b*. Terminals (wirings) 771-1 to 771-3 for connection with the light receiving chip 201*b* are also provided on the back surface side of the detection chip 202*b*. The terminal 611-1, the terminal 611-2, and the terminal 611-3 of the light receiving chip 201*b* are connected respectively with the terminal 771-1, the terminal 771-2, and the terminal 771-3 of the detection chip 202*b*.

In this manner, the chips can be configured to be directly bonded to each other.

In the detection chip 202*b* of the imaging element 200*b*, elements are formed on each of both surfaces of one semiconductor substrate, similarly to the detection chip 202*a* of the imaging element 200*a* according to the first embodiment. A back surface region 701*b* is formed on the back surface side of the detection chip 202*b*, and a front surface region 702*b* is formed on the front surface side. A separation layer 703*b* for electrically separating elements is formed between the back surface region 701*b* and the front surface region 702*b*.

The elements formed in the front surface region 702*a* of the detection chip 202*a* illustrated in FIG. 14 are formed in the back surface region 701*b* of the detection chip 202*b* illustrated in FIG. 15. That is, the element 721-1, the element 721-2, and the element 721-3 are formed in the back surface region 701*b* of the detection chip 202*b* illustrated in FIG. 15.

The elements formed in the back surface region 701*a* of the detection chip 202*a* illustrated in FIG. 14 are formed in the front surface region 702*b* of the detection chip 202*b* illustrated in FIG. 15. That is, the element 711-1, the element 711-2, and the element 711-3 are formed in the front surface region 702*b* of the detection chip 202*b* illustrated in FIG. 15.

As described above, the elements formed in the back surface region 701 of the detection chip 202 and the elements formed in the front surface region 702 are only required to be elements included in the detection chip 202, and the elements to be formed are not limited.

The element 721-1 of the detection chip 202*b* illustrated in FIG. 15 is connected with the terminal 771-1 via a contact 781-1. The element 721-2 is connected with the terminal 771-2 via a contact 781-2, and the element 721-3 is connected with the terminal 771-3 via a contact 781-3.

The element 711-1 of the detection chip 202*b* illustrated in FIG. 15 is connected with a terminal 791-1 via a contact 781-4. The element 711-2 and the element 711-3 are connected with a terminal 791-2 via a common wiring and a contact 781-5.

As described above, the detection chip 202*b* and the light receiving chip 201*b* in which elements are formed on both surfaces of one semiconductor substrate may be configured to be connected by directly bonding the terminals provided on the surfaces of the respective chips.

In the second embodiment, the elements included in the detection chip 202 can also be more efficiently accommodated, and the imaging element 200 can also be further downsized by forming elements respectively on both surfaces of one semiconductor substrate, similarly to the first embodiment.

Figure 16:
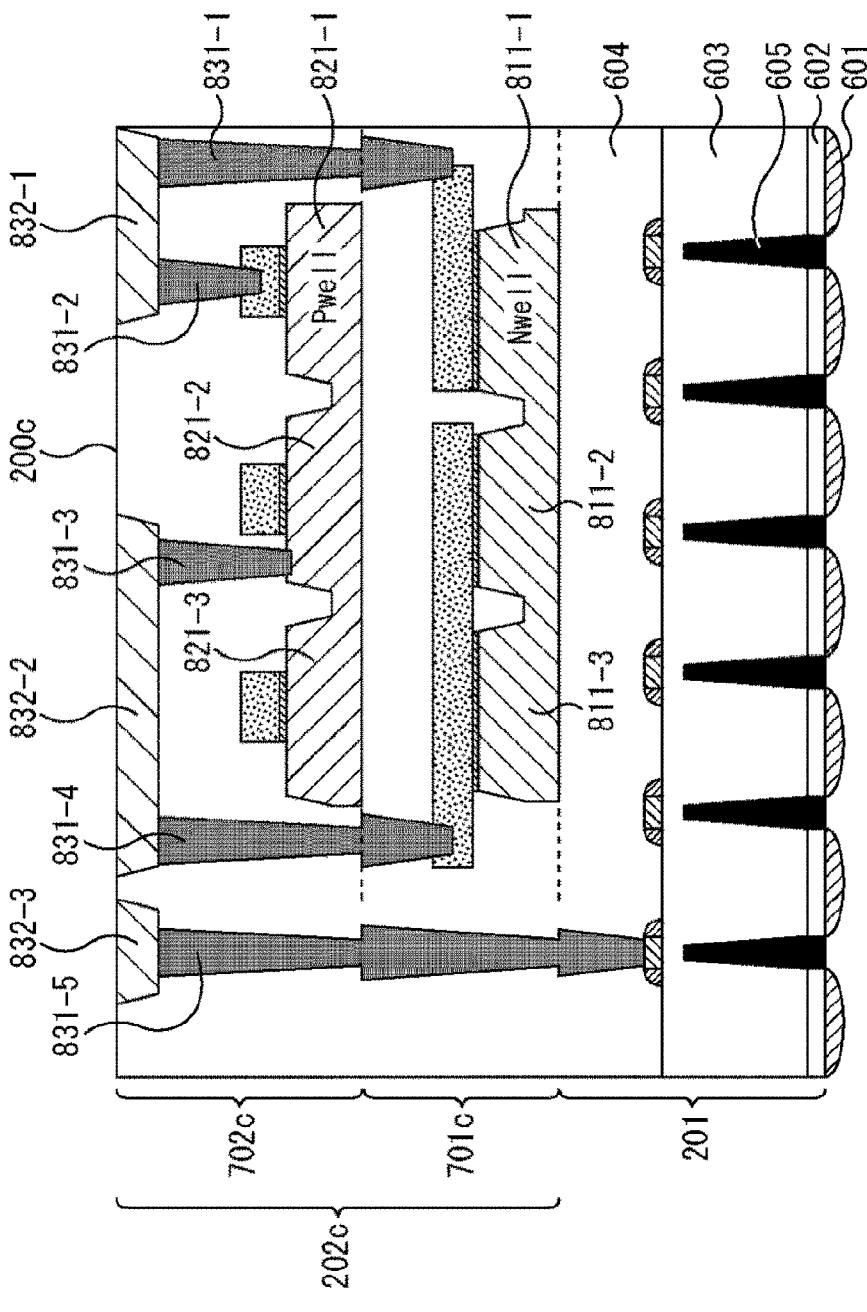
FIG. 16 is a diagram illustrating another cross-sectional configuration example of an imaging element.

Cross-Sectional Configuration Example of Imaging
Element According to Third Embodiment FIG. 16 is a diagram illustrating a cross-sectional configuration example of an imaging element 200*c* according to the third embodiment.

The imaging element 200*c* illustrated in FIG. 16 is different from the imaging elements 200*a* and 200*b* according to the first and second embodiments in that a detection chip 202*c* stacked on a light receiving chip 201 has two layers of a semiconductor layer 701*c* and a semiconductor layer 702*c*. The semiconductor layer 701*c* corresponds to, for example, the back surface region 701*a* in the first embodiment, and the semiconductor layer 702*c* corresponds to the front surface region 702*a*.

In the semiconductor layer 701*c*, elements 811-1 to 811-3 including Nwell regions are formed. In the semiconductor layer 702*c*, elements 821-1 to 821-3 including Pwell regions are formed. The element 811-1 of the semiconductor layer 701*c* and the element 821-1 of the semiconductor layer 702*c* are connected via a contact 831-1, a contact 831-2, and a wiring 832-1.

The element 811-2 and the element 811-3 of the semiconductor layer 701*c*, and the element 821-2 and the element 821-3 of the semiconductor layer 702*c* are connected via a contact 831-3, a contact 831-4, and a wiring 832-2. A contact 831-5 is connected with the gate of a predetermined transistor formed in the light receiving chip 201 and with a wiring 832-3 formed in the detection chip 202*c*.

The semiconductor layer 701*c* and the semiconductor layer 702*c* including such elements and contacts are bonded at bonding surfaces, and the detection chip 202*c* and the light receiving chip 201 in which the semiconductor layer 701*c* and the semiconductor layer 702*c* are bonded are bonded. In the imaging element 200*c* according to the third embodiment, three device layers are formed by three semiconductor substrates.

In this manner, the detection chip 202*c* can also be formed by the two semiconductor layers 701*c* and 702*c*. The elements formed respectively in the semiconductor layer 701*c* and the semiconductor layer 702*c* can be elements having different characteristics. The elements having different characteristics can be, for example, an element having thermal resistance and an element not having thermal resistance, an element having a tolerance even with a poor S value and an element not having the tolerance, an element having a low gate interface order including low noise and an element not having a low gate interface order including low noise.

<Cross-Sectional Configuration Example of Imaging Element According to Fourth Embodiment>

Figure 17:
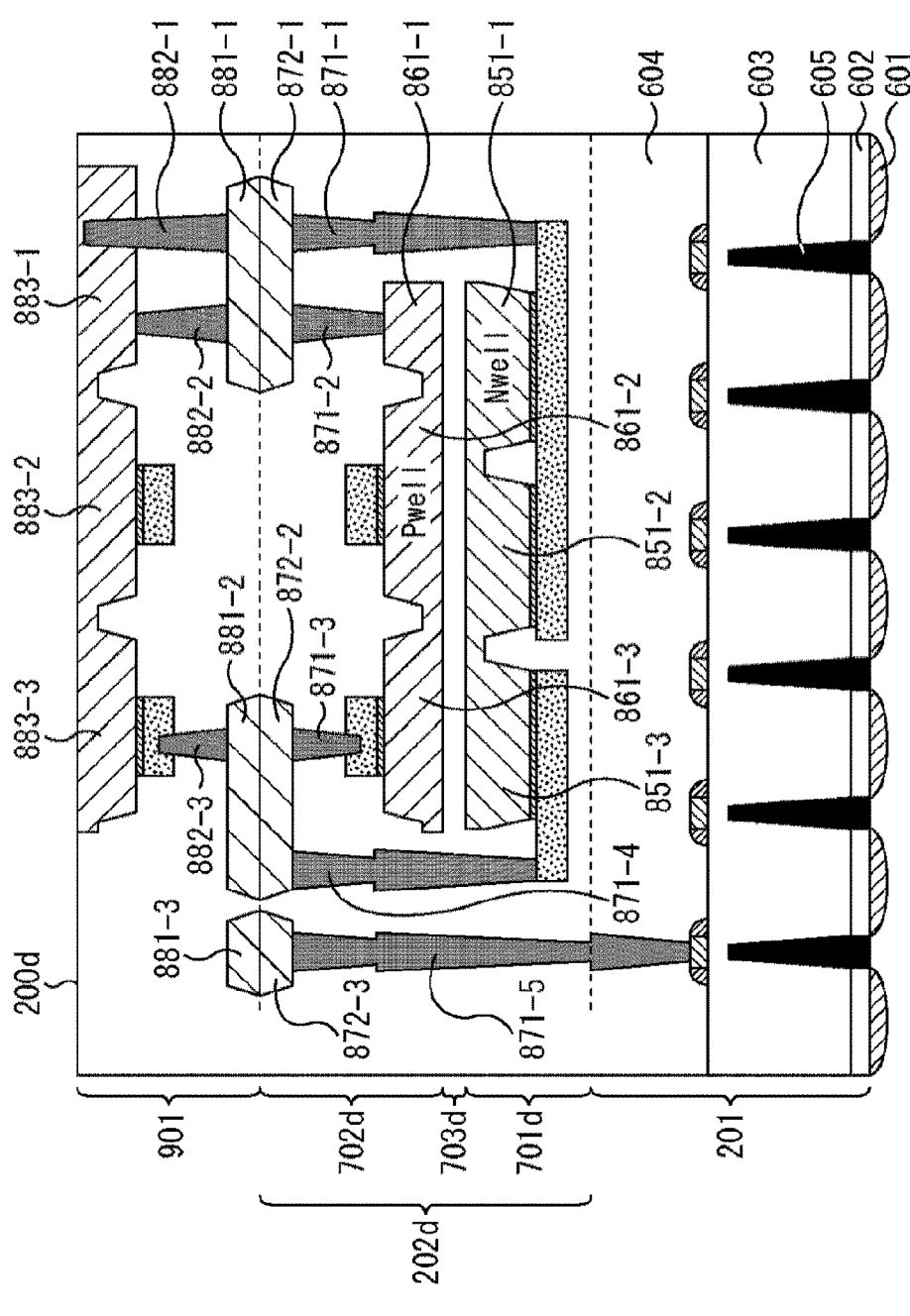
FIG. 17 is a diagram illustrating another cross-sectional configuration example of an imaging element.

FIG. 17 is a diagram illustrating a cross-sectional configuration example of an imaging element 200*d* according to the fourth embodiment.

The imaging element 200*d* according to the fourth embodiment is the same as the imaging element according to the first embodiment in that the imaging element includes a semiconductor substrate in which elements are formed on both surfaces of one semiconductor substrate as in the first embodiment. Moreover, the imaging element 200*d* according to the fourth embodiment is different from the imaging element according to the first embodiment in that the imaging element has a configuration in which another semiconductor substrate 901 is further stacked on a detection chip 202*d*.

In the detection chip 202*d* of the imaging element 200*d*, elements are formed on each of both surfaces of one semiconductor substrate. A back surface region 701*d* is formed on the back surface side of the detection chip 202*d*, and a front surface region 702*d* is formed on the front surface side. A separation layer 703*d* for electrically separating elements is formed between the back surface region 701*d* and the front surface region 702*d*.

An element 851-1, an element 851-2, and an element 851-3 are formed in the back surface region 701*d* of the detection chip 202*d* illustrated in FIG. 17. An element 861-1, an element 861-2, and an element 861-3 are formed in the front surface region 702*d* of the detection chip 202*d*.

The element 851-1 and the element 851-2 of the detection chip 202*d* illustrated in FIG. 17 are connected with a terminal (wiring) 872-1 via a common wiring and a contact 871-1. The terminal (wiring) 872-1 is also connected with the element 861-1 via a contact 871-2. The element 851-3 is connected with a terminal 872-2 via a contact 871-4. The terminal 872-2 is also connected with the element 861-3 via a contact 871-3.

A predetermined gate of the light receiving chip 201 is connected with a terminal (wiring) 872-3 via a contact 871-5. The terminals 872-1 to 872-3 are formed on the front surface of the detection chip 202*d*. The terminals 872-1 to 872-3 are connected respectively with terminals (wirings) 881-1 to 881-3 formed on the back surface of the semiconductor substrate 901.

In the semiconductor substrate 901, elements 883-1 to 883-3 are formed. The element 883-1 is connected with the terminal 872-1 via a contact 882-2. The terminal 872-1 is also connected with a contact 882-1 for connection with a chip or the like outside the semiconductor substrate 901. The element 883-3 is connected with the terminal 881-2 via a contact 882-3.

The light receiving chip 201 and the detection chip 202*d* of the imaging element 200*d* illustrated in FIG. 17 are connected via a contact. The detection chip 202*d* and the semiconductor substrate 901 have a configuration in which the substrates are directly bonded to each other. The imaging element 200*d* has a configuration in which four device layers are formed by three semiconductor substrates.

In the fourth embodiment, the elements included in the detection chip 202 can also be more efficiently accommodated, and the imaging element 200 can also be further downsized by forming elements respectively on both surfaces of one semiconductor substrate, similarly to the first embodiment.

Note that, similarly to the detection chip 202*d*, the semiconductor substrate 901 may also have a configuration in which elements are formed respectively on both surfaces of one semiconductor substrate, in other words, a configuration in which two device layers are formed on one semiconductor substrate.

A case where a plurality of semiconductor substrates in which two device layers are formed on one semiconductor substrate is stacked is also within an application range of the present technology.

Figure 18:
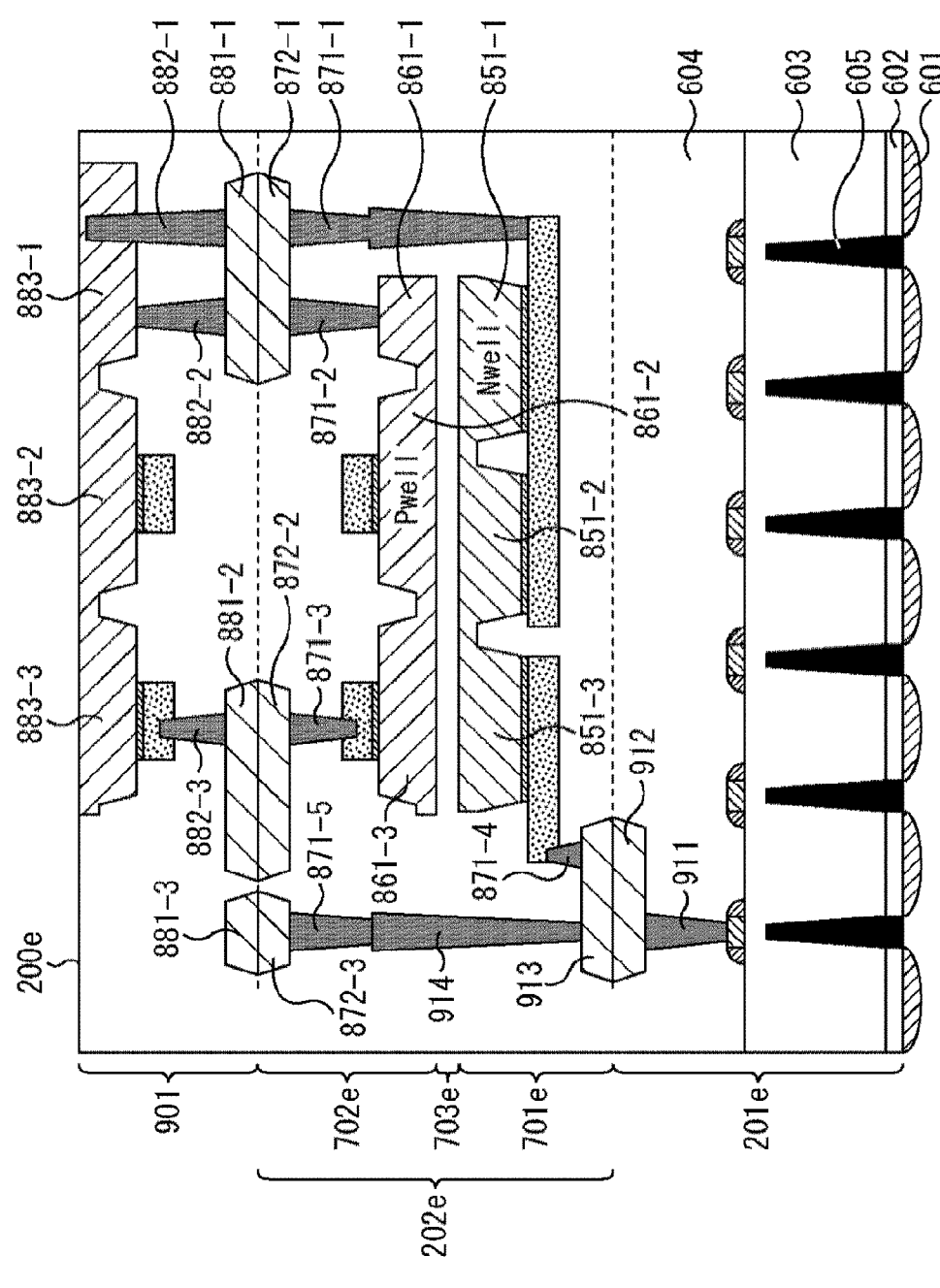
FIG. 18 is a diagram illustrating another cross-sectional configuration example of an imaging element.

Cross-Sectional Configuration Example of Imaging Element According to Fifth Embodiment FIG. 18 is a diagram illustrating a cross-sectional configuration example of an imaging element 200*e* according to the fifth embodiment.

The imaging element 200*e* according to the fifth embodiment is different from the imaging element 200*d* according to the fourth embodiment in that a light receiving chip 201*e* and a detection chip 202*e* are directly bonded, and the other points are similar.

A terminal (wiring) 912 is provided on the front surface of the light receiving chip 201*e*, and the terminal 912 is connected with a predetermined gate via a contact 911. The terminal 912 is bonded to a terminal (wiring) 913 formed on the back surface of the detection chip 202*e*. The terminal 913 is connected with a contact 914.

The light receiving chip 201*e* and the detection chip 202*e* of the imaging element 200*e* illustrated in FIG. 18 have a configuration in which the chips are directly bonded to each other. The detection chip 202*e* and a semiconductor substrate 901 have a configuration in which the substrates are directly bonded to each other. The imaging element 200*e* has a configuration in which four device layers are formed by three semiconductor substrates.

In the fifth embodiment, the elements included in the detection chip 202 can also be more efficiently accommodated, and the imaging element 200 can also be further downsized by forming elements respectively on both surfaces of one semiconductor substrate, similarly to the first embodiment.

Although a case where the imaging element 200 according to the first to fifth embodiments described above is used for DVS has been described as an example, the present technology can also be applied to other than DVS. For example, the present technology can also be applied to an imaging element used in an imaging device such as a camera that captures an image.

Example of Application to Mobile Body

The technology according to the present disclosure (the present technology) can be applied to various products. For example, the technique according to the present disclosure may be implemented as a device mounted on any type of mobile body such as an automobile, an electric vehicle, a hybrid electric vehicle, a motorcycle, a bicycle, a personal mobility, an airplane, a drone, a ship, or a robot.

Figure 19:
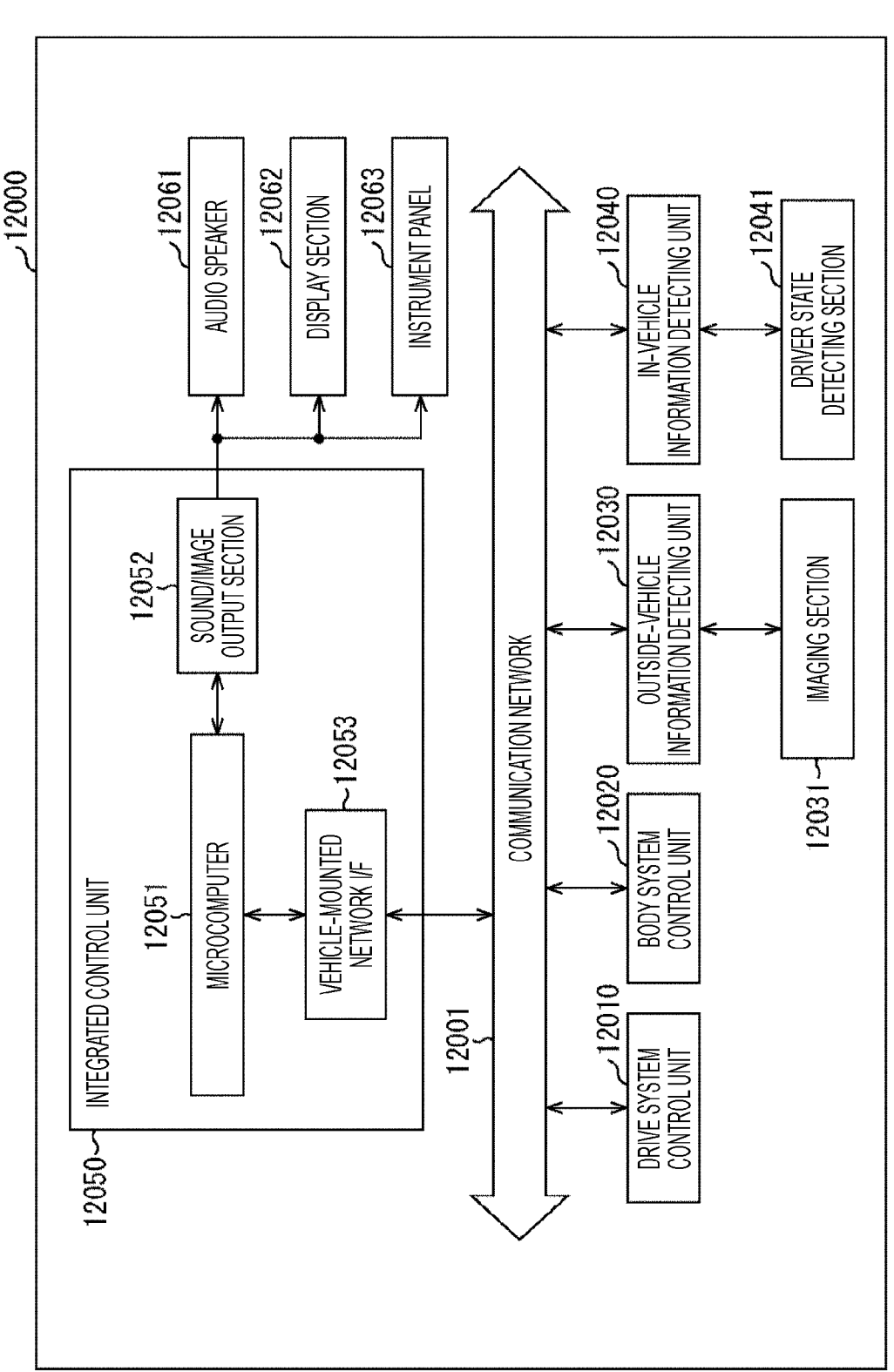
FIG. 19 is a block diagram illustrating an example of a schematic configuration of a vehicle control system.

FIG. 19 is a block diagram illustrating a schematic configuration example of a vehicle control system that is an example of a mobile body control system to which the technology according to the present disclosure can be applied.

The vehicle control system 12000 includes a plurality of electronic control units connected to each other via a communication network 12001. In the example illustrated in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example in FIG. 19, an audio speaker 12061, a display section 12062, and an instrument panel 12063 are illustrated as output devices. The display section 12062 may, for example, include at least one of an on-board display and a head-up display.

Figure 20:
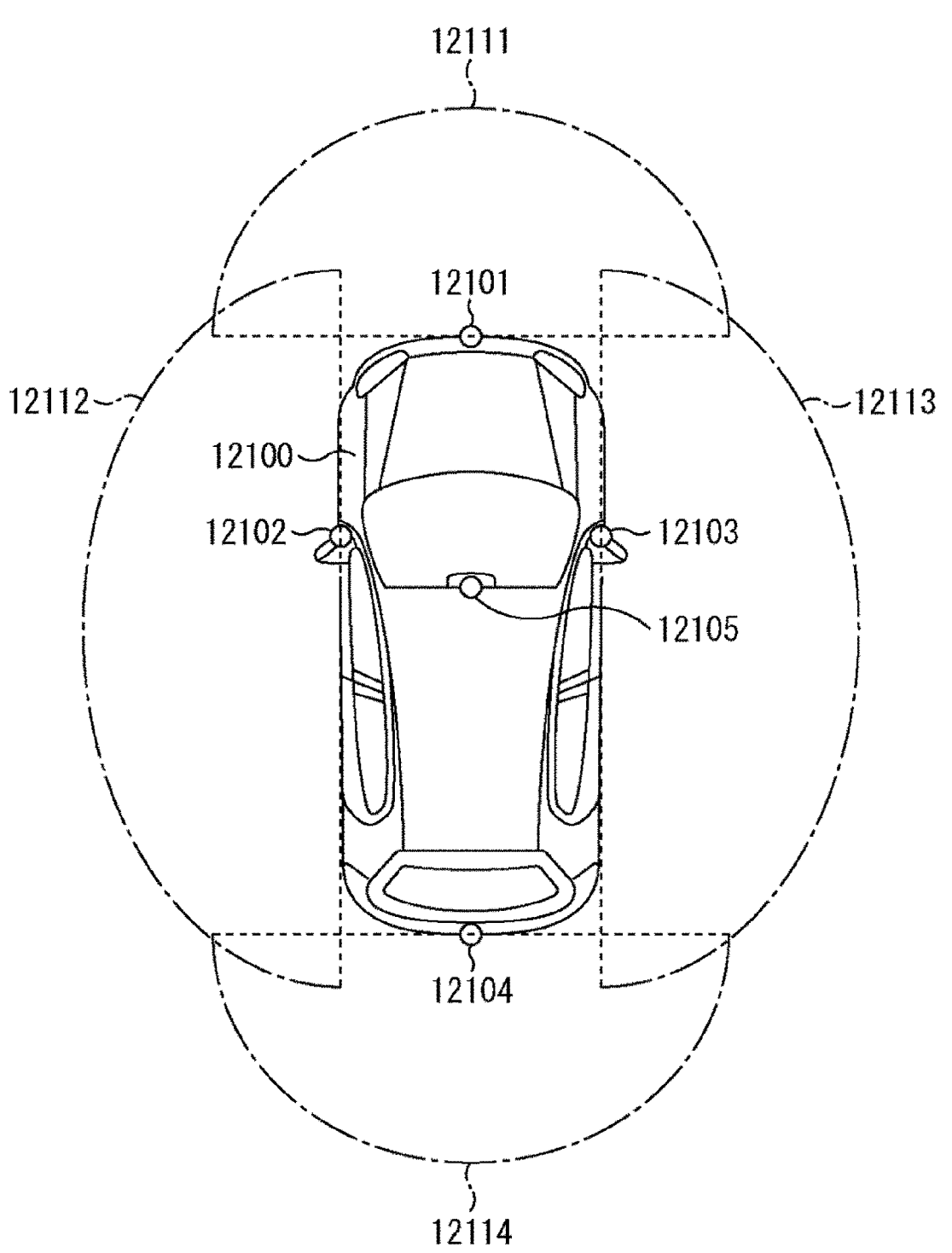
FIG. 20 is an explanatory diagram illustrating an example of installation positions of a vehicle exterior information detection unit and an imaging section.

FIG. 20 is a diagram illustrating an example of an installation position of the imaging section 12031.

In FIG. 20, imaging sections 12101, 12102, 12103, 12104, and 12105 are provided as the imaging section 12031.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Note that FIG. 20 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

In the present specification, the system represents the entire device including a plurality of devices.

Note that the effects described in the present specification are merely examples and are not limited, and other effects may be provided.

Note that embodiments of the present technology are not limited to the embodiments described above, and various modifications can be made without departing from the gist of the present technology.

Note that the present technology may also have the following configurations.

(1)
    An imaging element including:
        a first substrate including a plurality of detection pixels that generates a voltage signal corresponding to a logarithmic value of a photocurrent; and a second substrate including a detection circuit that detects whether a change amount of the voltage signal of a detection pixel indicated by an inputted selection signal among the plurality of detection pixels exceeds a predetermined threshold or not,
    the first substrate and the second substrate being stacked,
    in which an element constituting the detection circuit is disposed in each of a first region on a back surface side and a second region on a front surface side of the second substrate.

(2)
    The imaging element according to (1), further including a separation layer that electrically separates the first region and the second region from each other, the separation layer being provided between the first region and the second region.

(3)
    The imaging element according to (1) or (2),
    in which an element disposed in the first region and an element disposed in the second region have different S-value characteristics.

(4)
    The imaging element according to any one of (1) to (3),
    in which an element disposed in the first region and an element disposed in the second region have different thermal resistances.

(5)
    The imaging element according to any one of (1) to (4),
    in which an element disposed in the first region and an element disposed in the second region have different drive voltages.

(6)
    The imaging element according to any one of (1) to (5),
    in which an element disposed in the first region and an element disposed in the second region have different gate interface orders.

(7)
    The imaging element according to any one of (1) to (6),
    in which an element in the first substrate and an element in the second substrate are connected by a contact.

(8)
    The imaging element according to any one of (1) to (6),
    in which a wiring provided in the first substrate and a wiring provided in the second substrate are bonded.

(9)
    The imaging element according to any one of (1) to (8),
    in which a third substrate is further stacked on the second substrate.

(10)
    The imaging element according to (9),
    in which a wiring provided in the second substrate and a wiring provided in the third substrate are bonded.

(11)
    An imaging device including:
    a plurality of detection pixels each configured to generate a voltage signal corresponding to a logarithmic value of a photocurrent;
    a detection circuit that detects whether a change amount of the voltage signal of a detection pixel indicated by an inputted selection signal among the plurality of detection pixels exceeds a predetermined threshold or not; and
    a signal processing unit that processes a detection signal indicating a detection result of the detection circuit, in which an element constituting the detection circuit is disposed in each of a region on a back surface side and a region on a front surface side of a substrate including the detection circuit.

REFERENCE SIGNS LIST

100 Imaging device
110 Optical unit
120 Recording unit
130 Control unit
200 Imaging element
201 Light receiving chip
202 Detection chip
209 Signal line
211 Via disposition portion
212 Via disposition portion
213 Via disposition portion
220 Light receiving unit
221 Shared block
231 Via disposition portion
232 Via disposition portion
233 Via disposition portion
240 Signal processing circuit
251 Row drive circuit
252 Column drive circuit
260 Address event detection unit
300 Detection pixel
305 Detection circuit
310 Logarithmic response unit
311 Photoelectric conversion element
312 Transistor
313 Transistor
314 Transistor
320 Detection block
330 Buffer
340 Differentiator
341 Capacitor
342 Inverter
343 Capacitor
344 Switch
345 pMOS transistor
346 pMOS transistor
347 nMOS transistor
360 Transfer circuit
400 Selection unit
410 Selector
411 pMOS transistor
420 Selector
500 Comparison unit
510 Comparator
511 pMOS transistor
512 nMOS transistor
520 Comparator
601 On-chip lens layer
602 Color filter layer
603 Photoelectric conversion element layer
604 Wiring layer
605 Inter-pixel separation portion
611 Terminal
701 Back surface region
702 Front surface region
703 Separation layer
711 Element
721 Element
731 Contact
741 Gate 742 Wiring
751 Electrode
771 Terminal
781 Contact
791 Terminal
811 Element
821 Element
831 Contact
851 Element
861 Element
871 Contact
872 Terminal
881 Terminal
882 Contact
883 Element
901 Semiconductor substrate
911 Contact
912 Terminal
913 Terminal
914 Contact

The invention claimed is:

1. An imaging element, comprising:
a first substrate including a plurality of detection pixels, wherein each detection pixel of the plurality of detection pixels is configured to generate a voltage signal corresponding to a logarithmic value of a photocurrent; and
a second substrate including a detection circuit, wherein the detection circuit is configured to:
select a detection pixel of the plurality of detection pixels based on an input selection signal; and
detect whether a change amount of the voltage signal of the selected detection pixel exceeds a specific threshold, wherein
the first substrate is stacked on the second substrate,
the detection circuit comprises a plurality of elements,
a first element of the plurality of elements is in a first region on a back surface side of the second substrate, a second element of the plurality of elements is in a second region on a front surface side of the second substrate, and
the first element in the first region and the second element in the second region have different drive voltages.

2. The imaging element according to claim 1, further comprising:
a separation layer configured to separate the first region and the second region, wherein
the separation layer is between the first region and the second region.

3. The imaging element according to claim 1, wherein the first element in the first region and the second element in the second region have different subthreshold swing value (S-value) characteristics.

4. The imaging element according to claim 1, wherein the first element in the first region and the second element in the second region have different thermal resistances.

5. The imaging element according to claim 1, wherein the first element in the first region and the second element in the second region have different gate interface orders.

6. The imaging element according to claim 1, wherein the first element in the first substrate and the second element in the second substrate are connected by a contact.

7. The imaging element according to claim 1, wherein a wiring in the first substrate and a wiring in the second substrate are bonded.

8. The imaging element according to claim 1, wherein a third substrate is further stacked on the second substrate.

9. The imaging element according to claim 8, wherein a wiring in the second substrate and a wiring in the third substrate are bonded.

10. An imaging device, comprising:

a plurality of detection pixels, wherein each detection pixel of the plurality of detection pixels is configured to generate a voltage signal corresponding to a logarithmic value of a photocurrent;

a detection circuit configured to:

select a detection pixel of the plurality of detection pixels based on an input selection signal; and detect whether a change amount of the voltage signal of the selected detection pixel exceeds a specific threshold; and a signal processing unit configured to process a detection signal indicating a detection result of the detection circuit, wherein the detection circuit comprises a plurality of elements, a first element of the plurality of elements is in a first region on a back surface side of a substrate including the detection circuit, a second element of the plurality of elements is in a second region on a front surface side of the substrate including the detection circuit, and the first element in the first region and the second element in the second region have different drive voltages.

* * * * *